United States Patent
Hanke et al.

(10) Patent No.: US 12,434,216 B2
(45) Date of Patent: Oct. 7, 2025

(54) PLASMALYSIS APPARATUS FOR THE CORONA DISCHARGE-INDUCED CRACKING OF HYDROGEN-CONTAINING GAS

(71) Applicant: GRAFORCE GMBH, Berlin (DE)

(72) Inventors: Jens Hanke, Berlin (DE); Sascha Knist, Berlin (DE)

(73) Assignee: GRAFORCE GMBH (DE)

( * ) Notice: Subject to any disclaimer, the term of this patent is extended or adjusted under 35 U.S.C. 154(b) by 490 days.

(21) Appl. No.: 18/011,374

(22) PCT Filed: Jun. 23, 2021

(86) PCT No.: PCT/EP2021/067188
§ 371 (c)(1),
(2) Date: Dec. 19, 2022

(87) PCT Pub. No.: WO2021/260027
PCT Pub. Date: Dec. 30, 2021

(65) Prior Publication Data
US 2023/0264167 A1    Aug. 24, 2023

(30) Foreign Application Priority Data

Jun. 26, 2020   (DE) .................... 10 2020 116 950.7

(51) Int. Cl.
*B01J 19/08*    (2006.01)
(52) U.S. Cl.
CPC ...... *B01J 19/088* (2013.01); *B01J 2219/0807* (2013.01); *B01J 2219/0849* (2013.01);
(Continued)
(58) Field of Classification Search
None
See application file for complete search history.

(56) References Cited

U.S. PATENT DOCUMENTS

| | | |
|---|---|---|
| 6,245,309 B1 | 6/2001 | Etievant et al. |
| 2007/0267289 A1 | 11/2007 | Jabs et al. |
| 2012/0167464 A1 | 7/2012 | Chen et al. |

FOREIGN PATENT DOCUMENTS

| | | |
|---|---|---|
| CN | 104445059 A | 3/2015 |
| WO | 2020041597 A1 | 2/2020 |

OTHER PUBLICATIONS

Garduño, M. et al., "Hydrogen production from methane conversion in a gliding arc," Journal of Renewable and Sustainable Energy, Mar. 16, 2012, pp. 021202-1-021202-8, vol. 4.
(Continued)

*Primary Examiner* — Colin W. Slifka
(74) *Attorney, Agent, or Firm* — Lerner David LLP

(57) ABSTRACT

The present invention relates to the corona discharge-induced cracking of hydrogen-containing gas into molecular hydrogen and at least one by-product, or the production of molecular hydrogen and at least one by-product, or the production of downstream products from the molecular hydrogen and/or the at least one by-product. To this end, hydrogen-containing gas is fed via a gas supply line into a gas-tight reaction chamber with exactly one plasma electrode. The gas-tight reaction chamber is enclosed by a wall that is designed to electrically insulate the plasma electrode from an outside of the wall. The plasma electrode is connected to a high-frequency generator that provides high-frequency alternating voltage and generates corona discharges in the reaction chamber by means of the high-frequency alternating voltage. This results in the cracking of hydrogen-containing gas into molecular hydrogen and at least one by-product. The molecular hydrogen is discharged from the reaction chamber via a gas discharge line. The hydrogen-containing gas can contain, for example, methane, biogas, natural gas, hydrogen sulfide, or cyclohexane, hep-
(Continued)

tane, toluene, gasoline, JP-8, or diesel that have been converted into the gaseous aggregate state.

15 Claims, 8 Drawing Sheets

(52) U.S. Cl.
 CPC ............... *B01J 2219/0869* (2013.01); *B01J 2219/0875* (2013.01)

(56) References Cited

OTHER PUBLICATIONS

International Search Report for Application No. PCT/EP2021/067188 mailed Oct. 28, 2021, pp. 1-4.

Subbotin, D.I. et al., "Fullerenes production by electric arc pyrolysis of methane in an AC three-phase plasma torch ," E3S Web of Conferences, Oct. 25, 2019, pp. 1-4.

Sun, J. et al., "Kinetic roles of vibrational excitation in RF plasma assisted methane pyrolysis," Journal of Energy Chemistry, Feb. 21, 2019, pp. 188-197, vol. 39, Elsevier.

Tu, X. et al., "Plasma dry reforming of methane in an atmospheric pressure AC gliding arc discharge: Co-generation of syngas and carbon nanomaterials," International Journal of Hydrogen Energy, Jun. 15, 2014, pp. 9658-9669, vol. 39, Issue 18, Elsevier. [Abstract Only].

Zhao, G.B. et al., "Methane conversion in pulsed corona discharge reactors," Chemical Engineering Journal, Dec. 15, 2006 (Dec. 15, 2006), pp. 67-79, vol. 125, No. 2, Elsevier, Amsterdam, NL. XP028035883.

PLASMALYSIS APPARATUS FOR THE CORONA DISCHARGE-INDUCED CRACKING OF HYDROGEN-CONTAINING GAS

CROSS-REFERENCE TO RELATED APPLICATIONS

The present application is a national phase entry under 35 U.S.C. § 371 of International Application No. PCT/EP2021/067188 filed Jun. 23, 2021, which claims priority from German Patent Application No. 10 2020 116 950.7 filed Jun. 26, 2020, all of which are incorporated herein by reference.

FIELD OF THE PRESENT DISCLOSURE

The present disclosure generally relates to a plasmalysis apparatus for the corona discharge-induced cracking of hydrogen-containing gas into molecular hydrogen and at least one by-product or secondary product, as well as a plasmalysis system with at least two such plasmalysis apparatuses and a method for the corona discharge-induced cracking of hydrogen-containing gas into molecular hydrogen and at least one by-product and/or for the preparation of molecular hydrogen and at least one by-product.

BACKGROUND OF THE PRESENT DISCLOSURE

It is known that hydrocarbons, such as methane, natural gas, biogas or crude oil, can be separated into activated carbon and hydrogen in a plasma burner at about 1600° C. using the Kvaerner method.

Furthermore, for the laboratory scale, the conversion of methane into different carbon-containing and hydrogen-containing gases, such as ethyne, ethane and ethene, in a co-axially pulsed corona-discharge reactor is known from Gui-Bing Zhao et al., "Methane conversion in pulsed corona discharge reactors", Chemical Engineering Journal 125 (2006) 67-79. The corona discharge reactor uses a stainless steel wire as the anode and a stainless steel cathode or niobium cathode surrounding the anode. The anode is arranged along a central axis of the cathode. The anode is positively charged, and the cathode is grounded. Gas flowing through the cathode is converted into a plasma by a high-voltage discharge from the anode. The corona discharge reactor is operated with voltages between 10 kV and 25 kV at pulse frequencies between 0 and 1000 Hz.

This is where the present disclosure comes in; it offers an improved plasmalysis apparatus for the corona discharge-induced cracking of hydrogen-containing gas into molecular hydrogen and at least one by-product, or for the preparation of molecular hydrogen and at least one by-product.

SUMMARY OF THE PRESENT DISCLOSURE

According to a first aspect, the present disclosure relates to a plasmalysis apparatus for the corona discharge-induced cracking of hydrogen-containing gas into molecular hydrogen and at least one by-product, or for the preparation of molecular hydrogen and at least one by-product. The plasmalysis apparatus includes a gas-tight reaction chamber, a gas supply line for the hydrogen-containing gas into the reaction chamber, exactly one plasma electrode for generating corona discharges in the reaction chamber by means of a high-frequency alternating voltage, and a gas discharge line for the molecular hydrogen from the reaction chamber. The gas-tight reaction chamber is enclosed by a wall which is designed to electrically insulate the plasma electrode from an outside of the wall. The plasma electrode is connected to a high-frequency generator for generating the high-frequency alternating voltage.

Continuing, this aspect uses a so-called corona discharge, in particular on a flat end of the plasma electrode or on the tip of the plasma electrode, for example on a gas nozzle tip of the plasma electrode, which guides the hydrogen-containing gas into the reaction chamber. Preferably, a non-thermal plasma is generated during the corona discharge. This can reduce energy consumption when cracking hydrogen-containing gas since less energy is converted into thermal energy that cannot be efficiently reused. Thus, the costs related to the production of molecular hydrogen and the apparatus or equipment used to produce molecular hydrogen can be reduced.

Furthermore, a higher efficiency can be achieved as compared to using microwave plasma processes, such as the Kvaerner process, which operate at an efficiency of about 60 percent. It is possible to achieve an efficiency of 85% with the plasmalysis apparatus, for example. Here, it is understood that the efficiency refers to the electrical power required to produce molecular hydrogen. For example, 1 kg of molecular hydrogen can be produced with the plasmalysis apparatus using 10 kWh. The Kvaerner process, for example, requires 13.75 kWh or 1.25 kWh/m$^3$ of molecular hydrogen for this.

Furthermore, in contrast to the microwave plasma processes, it is not necessary to operate under reduced pressure to produce the molecular hydrogen when using the plasmalysis apparatus.

In order to electrically insulate the plasma electrode from the outside of the wall of the reaction chamber, the wall is designed in such a way that the electrical flow through the surface of the wall from the outside to the plasma electrode is zero. To this end, an inside of the wall opposite the plasma electrode has a floating potential. This allows for a stronger electric field to be formed directly at the plasma electrode, thus making it easier to crack the hydrogen-containing gas. The wall can be a non-grounded, non-metallic wall for example. Alternatively, the wall can also be a metallic wall with a non-metallic insulation on its inside facing the plasma electrode, e.g. with a non-metallic insulation coating.

The present disclosure describes that a corona discharge can advantageously be generated with exactly one plasma electrode. No return electrode is provided here. The return electrode can be spontaneously formed by parts of the inside of the wall of the reaction chamber so that a strong electric field is created at the plasma electrode in the reaction chamber between the plasma electrode and parts of the inside of the wall of the reaction chamber. However, the electric field can also create a corona discharge without a spontaneously formed return electrode. Since only one plasma electrode is used, contamination and possible clogging of the plasma electrode can be reduced with a solid by-product or secondary product. Furthermore, since only one plasma electrode is used, electrode material ablation can be reduced.

The present disclosure is also based on the findings that, by using high-frequency alternating voltage with only one plasma electrode, plasmas from corona discharges can be ignited and operated at atmospheric pressure. Operating at atmospheric pressure can significantly reduce system and operating costs. In addition, contrary to an apparatus with one return electrode, a plasma breakdown can be generated at the end of the plasma electrode.

A corona discharge can occur in an electric field that is strong enough to spatially separate free electrons and ions after the ionization of an atom in a gas, so that they do not immediately recombine. This can also be used to separate different atoms in molecules by breaking up the connections between them. These atoms can then recombine to form new and/or differently compound molecules. For example, methane can be cracked into carbon atoms and hydrogen atoms which can then recombine to form molecular hydrogen and solid carbon structures.

A corona discharge can be as follows. A first free electron can be created by way of field ionization, which creates the free electron and a positive ion. In doing so, the potential curve for an electron bound within an atom is modified by a strong electric field, for example close to an electrode tip, in such a way that the electron can overcome or tunnel through the potential barrier. Alternatively, a first free electron can also be created if a high-energy photon hits an atom and ionizes the atom by means of the photoelectric effect, so that the free electron and a positive ion are created. The high-energy photon can, for example, be provided by a radiation source, e.g. a UV radiation source, or by way of a natural occurrence, for example a photon generated by cosmic rays.

The strong electric field accelerates the differently charged particles, i.e. the negatively charged free electron and the positively charged ion, in different directions, thus spatially separating them. The positively charged ion can be part of a molecule with several atoms, so that the positively charged molecule can be accelerated. Because of the same amount of charge, but a lower mass of the electron, it is accelerated much more strongly than the positively charged ion and, if it hits another atom, can ionize it and create another free electron. It is also possible that several free electrons hit several atoms of the molecule, so that the molecule can be cracked into its atoms. This could result in an electron avalanche since each new free electron can create additional free electrons.

Part of the free electrons recombine with the positively charged ions and create neutral atoms while producing a high-energy photon which, in turn, can ionize additional atoms. The photons are visible as a typical corona luminescence.

The electric field strength gets so weak at a certain distance from the plasma electrode that the electrons no longer have enough energy to produce additional free electrons and positively charge ions. This delimits the corona discharge and constitutes its outer limit. The positively charged ions can recombine with electrons of the electrode or with free electrons. Furthermore, atoms can recombine with each other to form newly compounded molecules.

The plasmalysis apparatus according to an aspect of the present disclosure can thus be used to efficiently crack larger amounts of hydrogen-containing gas into molecular hydrogen and at least one by-product at a lower cost, thereby making it possible to produce molecular hydrogen and at least one by-product from hydrogen-containing gas.

The hydrogen-containing gas can contain methane, for example. For example, the hydrogen-containing gas can contain more than 75% methane, preferably more than 90% methane, e.g. between 90% and 99% methane. The methane is cracked into hydrogen and elemental carbon in the corona discharge; in particular, the chemical reaction n $CH_4 \rightarrow$ n C (s)+2n $H_2$ occurs, wherein n C (s) can contain various solid carbon structures, e.g. one or several carbon structures $C_k$ with k smaller than or equal to n. Carbon structures can be elemental carbon particles, carbon nanotubes, fullerenes, carbon nanocones or other carbon structures, for example. The elemental carbon particles can have a size of between 50 μm and 180 μm, for example. Carbon layers may also form. This makes it possible to efficiently produce molecular hydrogen and elemental carbon from methane.

Alternatively, or additionally, the hydrogen-containing gas can contain hydrogen sulfide. For example, the hydrogen-containing gas can contain up to 35% hydrogen sulfide, e.g. between 0% and 35% hydrogen sulfide. In the corona discharge, the hydrogen sulfide is cracked into hydrogen and elemental sulfur; in particular, the chemical reaction $H_2S \rightarrow H_2 + S$ (s) occurs. This makes it possible to efficiently produce molecular hydrogen and elemental sulfide from hydrogen sulfide.

The hydrogen-containing gas can be natural gas, for example. Natural gas can contain the following substances, for example:

- between 30% and 99% methane, e.g. between 75% and 99% methane, in particular between 90% and 99% methane;
- between 0% and 15% ethane, e.g. between 1% and 15% ethane, in particular between 1% and 3% ethane;
- between 0% and 10% propane, e.g. between 1% and 10% propane, in particular between 0.3% and 0.5% propane;
- between 0% and 1% butane, in particular between 0.1% and 0.2% butane;
- between 0% and 1% ethene;
- between 0% and 1% pentane, in particular between 0.01% and 0.03% pentane;
- between 0% and 1% hexane, in particular between 0.001% and 0.02% hexane;
- between 0% and 35% hydrogen sulfide;
- between 0% and 70% nitrogen, e.g. between 0% and 15% nitrogen, in particular between 0.5% and 1% nitrogen;
- between 0% and 10% carbon dioxide, in particular between 0.1% and 0.3% carbon dioxide;

In addition, natural gas can contain traces of oxygen, e.g. between 0.001% and 0.01% oxygen. Natural gas can also contain noble gases, such as helium, argon, neon, krypton or xenon, for example with a respective volume share of between 0% and 15%.

The hydrogen-containing gas can also contain a hydrogen-containing substance that has been converted into the gaseous aggregate state and that is liquid at room temperature, such as cyclohexane, heptane, toluene, gasoline, JP-8, or diesel. The hydrogen-containing substance that has been converted into the gaseous aggregate state can be converted into the gaseous aggregate state by way of atomization and/or heating, for example. To this end, an atomizer and/or a heating element can be provided that can atomize and/or heat the liquid in order to convert it into the gaseous aggregate state. For example, the atomizer and/or the heating element can be located upstream from or in the gas supply line that feeds the hydrogen-containing gas into the reaction chamber. This way molecular hydrogen can also be obtained from other hydrogen-containing substances that are not in a gaseous state at room temperature. Furthermore, this can make it possible to considerably reduce the carbon dioxide emission of the transport sector. For this purpose, the plasmalysis apparatus or several plasmalysis apparatuses can, for example, be arranged between the tank of a vehicle, e.g. a ship, an airplane, a locomotive, a power car, a truck, a passenger car, or the like, and its drive train so as to convert fossil fuel, such as gasoline, JP-8, diesel or crude oil into molecular hydrogen and elemental carbon. The molecular hydrogen can be used directly as the fuel in the drive train of the vehicle for operating the vehicle. Alternatively, the molecular hydrogen can also be used together with an additional gaseous by-product as a synthetic fuel, for example synthetic gas or synthesis gas or also syngas, as fuel in the drive train. To this end, synthetic fuel that can be used as fuel can be produced by means of the plasmalysis apparatus. Furthermore, the hydrogen can also be used to power a fuel cell, which can then be used to power an electric motor. This makes it possible to reduce the adaptation of the vehicles to operate with hydrogen or synthetic gas. Furthermore, this can make it possible to continue using the existing infrastructure for fossil fuels while considerably reducing the carbon dioxide emission of vehicles. The elemental carbon generated during plasmalysis can be collected in the vehicle. As a result, a nearly carbon dioxide-free traffic can be achieved with fossil fuels if the fossil fuels are converted into molecular hydrogen in the plasmalysis apparatus, which molecular hydrogen is then used for powering the vehicles.

Advantageous embodiments of the plasmalysis apparatus according to the present disclosure will be described below. The additional features of the exemplary embodiments can be combined to form further embodiments, unless the description expressly characterizes them as alternatives to each other.

The plasmalysis apparatus can have a housing. The housing can feature the reaction chamber, the gas supply line, the plasma electrode, and the gas discharge line. The reaction chamber can be formed by the housing so that the wall of the reaction chamber is an outside wall of the housing. Alternatively, the reaction chamber can also be arranged inside the housing so that the wall of the reaction chamber and the outside wall of the housing are not identical.

The high-frequency generator can be part of the plasmalysis apparatus or connected to the plasmalysis apparatus as a separate device. The high-frequency generator can be arranged inside or outside the housing. Preferably, the high-frequency generator is arranged outside the housing. In this case, electrical contact can be made from the outside, i.e. from outside the housing.

The high-frequency generator can have a predefined output impedance and be connected to the plasma electrode via a matching network for impedance matching of the impedance of the plasma forming at the plasma electrode by the corona discharges, and of the output impedance of the high-frequency generator. The matching network can be part of the plasmalysis apparatus or part of the separate device that contains the high-frequency generator.

Advantageously, a so-called matching network (or matchbox) is used as a link between the high-frequency generator and the plasma formed during the corona discharge; this matching network aligns the ohmic and capacitive components of the plasma with the output impedance specified by the high-frequency generator. The impedance of the plasma is particularly dependent upon a distance of the plasma electrode from the corona discharge, a composition of the hydrogen-containing gas, a composition of the reaction chamber as well as of the housing enclosing the reaction chamber, the temperature in the reaction chamber, as well as the atmosphere in the reaction chamber.

The high-frequency generator can comprise a measuring device for measuring the intensity and power of an outgoing and returning wave. The measuring device can comprise a directional coupler and two detectors.

The output impedance of the high-frequency generator is preferably 50 ohms and/or an output power of the high-frequency generator is between 30 W and 50 kW. It has been shown that, in particular with this output impedance, a plasma forms particularly reliably while at the same time providing a good hydrogen yield.

Preferably, the high-frequency generator is designed to provide a high-frequency alternating voltage with a frequency in the range of 1 MHz to 40 MHz, in particular in the range of 10 MHz to 20 MHz, for example with a frequency of 13.56 MHz.

Advantageously, the matching network comprises at least one motor-controlled capacitor and at least one variable coil, for example two coils. Together, these make up an electrical oscillating circuit which enables the impedance matching to react continuously, also to fluctuating loads from the plasma. In a further embodiment, tuning of the capacitors and coils occurs automatically by means of a reflection and standing-wave control loop method.

The high-frequency generator can be designed to provide the alternating voltage in the form of sine waves. This can make it possible to achieve higher energy efficiency for the plasma generated during the corona discharge. Alternatively, or additionally, the high-frequency generator can also be designed to provide the alternating voltage in a complex waveform, a rectangular waveform, or in another waveform.

The gas supply line can be arranged in such a way that the hydrogen-containing gas flows along a surface of the plasma electrode in the direction of the corona discharge. The gas supply line can be arranged in such a way that the hydrogen-containing gas flows along an inner surface of the plasma electrode or along an outer surface of the plasma electrode in the direction of the corona discharge. The direction of the corona discharge corresponds to the flow direction of the hydrogen-containing gas from the gas supply line in the direction of the gas discharge line. For example, the gas supply line can be arranged in such a way that the hydrogen-containing gas flows parallel to the plasma electrode along its surface in the direction of the corona discharge. This can make it possible to remove contamination that accumulates on the surface of the plasma electrode. Furthermore, the position and the form of the plasma can be influenced thereby. For example, the plasma can be moved away from the gas supply line in the direction of the gas discharge line. In addition, this can ensure a secured plasma discharge at one end of the plasma electrode.

The plasma electrode can be solid.

The plasma electrode can have a flat end for generating corona discharges in the reaction chamber. This makes it possible to increase the plasma volume generated by the plasma electrode. The plasma electrode can also have an electrode with a curved or conical shape for generating corona discharges in the reaction chamber.

The plasma electrode can extend beyond the reaction chamber to outside the housing, which can make it easier to connect it to the high-frequency generator. Furthermore, this makes it possible to adjust a position of one end of the plasma electrode in the reaction chamber so that the position of the corona discharge within the reaction chamber can also be adjusted.

The plasma electrode can have an opening. The opening of the plasma electrode can be connected to the supply line. The plasma electrode can be arranged in such a way that the hydrogen-containing gas is fed into the reaction chamber through the opening of the plasma electrode, thus enabling direct contact of the plasma electrode with the plasma of the corona discharge. This can reduce energy consumption when cracking hydrogen-containing gas since the gas can be guided precisely through the non-thermal plasma of the corona discharge. It can also enable additional pyrolysis. The plasma electrode can also have several openings that are connected to the supply line. This makes it possible to feed the hydrogen-containing gas into the reaction chamber through several openings of the plasma electrode. The one opening or several of the openings can be designed to open and close. To this end, flaps in the openings or a sliding element, which can slide in front of the respective openings to be closed, can be provided, for example. This can enable improved control of the corona discharge. Alternatively, or additionally, the corona discharge can also be controlled by way of the amount of hydrogen-containing gas provided via the gas supply line, for example.

The opening of the plasma electrode can be designed as a nozzle for feeding the hydrogen-containing gas into the reaction chamber. The non-thermal plasma generated by the corona discharge then advantageously forms on the tip of the plasma electrode or on the nozzle.

Feeding the hydrogen-containing gas in through the nozzle can enable a cooling of the plasma electrode, in particular its tip. This can make it possible to reduce material stress. The nozzle can be in direct contact with the plasma of the corona discharge. The opening of the plasma electrode can have a cross-section varying between a plasma electrode side connected to the supply line and a plasma electrode side connected to the reaction chamber. In particular, the nozzle can taper across a section and/or widen across a section. The nozzle can be a Venturi nozzle or de Laval nozzle, for example. The shape of the nozzle and the diameter of the nozzle opening determine the duration of the corona discharge.

The plasma electrode can contain stainless steel, brass, carbon and/or aluminum, for example. Alternatively, the plasma electrode can also be made of stainless steel, brass, carbon, aluminum, or a combination of these. In particular, the plasma electrode can also be a graphite electrode. Aluminum, for example, has good conductivity and is relatively inexpensive. For example, the plasma electrode can also have different sections, e.g. a stainless steel section and a brass, carbon or aluminum section. The plasma electrode can be made of a heat-resistant material that is heat-resistant up to 800° C., for example. The plasma electrode can have a catalyst, for example iron, cobalt and/or nickel.

Additionally, or alternatively, the plasma electrode can have a coating, for example a catalytic coating, such as a nickel coating, an iron coating, a cobalt coating, or a platinum coating. The coating can enable a catalytic effect. Alternatively, the coating can also contain a ceramic material, such as aluminum oxide, nickel oxide and/or titanium oxide, for example. The coating can have a coating thickness of 200 m to 1000 μm, for example.

The plasma electrode can have an outer diameter of between 4 mm and 60 mm, e.g. 8 or 16 mm, for example. The opening of the plasma electrode can have a diameter of between 0.1 mm and 1 mm, for example 0.4 mm. If the plasma electrode has several openings, these can have a combined diameter of between 0.1 mm and 1 mm, for example. The diameter of the opening of the plasma electrode can be different along its longitudinal axis between the end connected to the gas supply line and the end connected to the reaction chamber. For example, the plasma electrode can have a length of between 50 mm and 300 mm, e.g. 150 mm.

The opening of the plasma electrode can be threaded. An aluminum rotating part may be provided in the opening, for example. A nozzle may be arranged in the opening of the plasma electrode. The nozzle may be screwed into the opening, for example, and form a reduced opening of the plasma electrode. For this purpose, the nozzle can have an external thread, for example. The nozzle can consist of one or several materials, for example brass and stainless steel. The nozzle can be an FDM nozzle that is used for fused deposition modeling, for example. The material or the materials of the nozzle can be heat resistant, for example up to a temperature of 800° C. The nozzle material can contain a catalyst. The nozzle can also have a coating, for example a catalytic coating.

The plasma electrode can be connected electroconductively by means of a plug connection.

The plasma electrode can be designed to receive power in the range between 30 W and 50 kW, for example.

The plasmalysis apparatus can be designed to emit surge gas pulses from the opening of the plasma electrode to remove solid by-product forming in the reaction chamber from the reaction chamber. This can prevent the plasma electrode, the opening of the plasma electrode and/or the reaction chamber from getting plugged with solid by-product forming during the corona discharge. The gas pulses can be made with the hydrogen-containing gas or another gas, for example an inert gas. For this purpose, the hydrogen-containing gas or the inert gas can be introduced via the gas supply line. The plasmalysis apparatus can be designed in such a way that no corona discharge occurs during the surge gas pulses. For example, in addition to the gas pulse, supply of high-frequency voltage to the plasma electrode can be briefly interrupted during the emission of a surge gas pulse, so that no corona discharge is generated. Alternatively, the plasmalysis apparatus can be designed in such a way that the corona discharge is maintained during the surge gas pulses. This allows for continuous cracking of the hydrogen-containing gas or continuous production of the molecular hydrogen.

The plasmalysis apparatus can feature an insulator that electrically insulates the plasma electrode from an outside of the wall. For example, the insulator can be arranged around the plasma electrode at a transition from the reaction chamber to an outer environment of the reaction chamber. The insulator can be a ceramic insulator, for example. The insulator can consist of one or several ceramics, e.g. of high-temperature ceramics, such as technical ceramics, for example. The high-temperature ceramics can contain aluminum oxide ($Al_2O_3$), for example. This makes it possible to electrically insulate the plasma electrode from the wall of the reaction chamber.

In this case, the plasma electrode can preferably be a graphite electrode. The plasma electrode, in the form of the graphite electrode, does not require cooling. While the plasmalysis apparatus is in operation, the graphite electrode can emit carbon atoms, for example 1 to 2 g of carbon per kWh. The graphite electrode can be arranged in the plasmalysis apparatus in such a way that it can be pushed into the reaction chamber after it has emitted part of the carbon atoms. For example, the graphite electrode can be pushed in continuously or discontinuously, e.g. when a certain amount of carbon atoms has been emitted. Continuous pushing in of the graphite electrode can enable a continuous production process of molecular hydrogen and the at least one by-product. Alternatively, or additionally, the wall of the reaction chamber can contain graphite or be made of graphite.

The reaction chamber can have a tapered section between the gas supply line and the gas discharge line. In addition, the reaction chamber can have an enlarged section between the gas supply line and the gas discharge line. This enables an increase of the flow speed to remove solid by-product, for example in the form of small particles, from the reaction chamber via the gas discharge line. In other words, it can create a nozzle flow. In addition, any introduction of solid by-product into a space that is located in the flow direction of the gas flow upstream from the tapered section can be avoided to a large extent. This can make it possible to keep the reaction chamber, in particular around the plasma electrode, free of solid by-product, thereby reducing the cleaning effort. The flow speed in the reaction chamber can be between 5 and 20 m/s, preferably between 12 and 14 m/s, for example.

A tapered section corresponds to an area in the reaction chamber with a reduced cross-section as compared to an axially adjacent area located upstream in the flow direction of the gas flow. In other words, with a tapered section, a cross-section of the reaction chamber is smaller along the longitudinal axis at the position of the tapered section compared to the area upstream of the tapered section. An enlarged section corresponds to an area in the reaction chamber with an enlarged cross-section as compared to an axially adjacent area located upstream in the flow direction of the gas flow. In other words, with an enlarged section, a cross-section of the reaction chamber is larger along the longitudinal axis at the position of the enlarged section compared to the area upstream of the enlarged section.

The tapered section and the enlarged section can be arranged successively and have the form of a de Laval nozzle.

The tapered section and the enlarged section can be arranged relative to the plasma electrode in such a way that the plasma generated during the corona discharge ends at a point in the reaction chamber with the narrowest cross-section or in its immediate vicinity. This can enable removal of by-product, in particular of small particles, through the nozzle flow. Furthermore, the hottest point of the plasma can thus be located at this position.

The plasmalysis apparatus can have one or several additional gas supply lines into the reaction chamber. These additional gas supply lines can be used to introduce a further hydrogen-containing gas into the reaction chamber, for example. It is also possible to introduce several different types of gas, e.g. nitrogen or noble gases. The introduced gases can be used for synthesizing a synthetic gas or syngas. The introduced gases can also be used additionally or alternatively for cleaning the reaction chamber, for example if solid byproduct has accumulated in the reaction chamber, in particular on its wall.

The additional gas supply lines can be arranged in the reaction chamber in such a way that they cause a turbulence in the gas flow, which facilitates removal of the gas flow from the reaction chamber via the gas discharge line. One or several of the additional gas supply lines can, for example, be arranged at a point in the gas flow or in the flow direction of the gas flow downstream from the enlarged section. This makes it possible to use the nozzle flow to mix the additional gases with the gas flow and discharge them from the reaction chamber.

The plasmalysis apparatus can have a control unit or be connected to a control unit. The control unit can be designed to control emission of the surge gas pulses. For example, the plasmalysis apparatus can be designed to emit surge gas pulses from the opening of the plasma electrode in a time-controlled manner, for example at regular time intervals. Alternatively, the plasmalysis apparatus can be designed to emit surge gas pulses from the opening of the plasma electrode dependent upon an event. The event can be dependent upon a power input into the plasmalysis apparatus, for example. In particular, the event can be that the power input into the plasmalysis apparatus falls below a threshold value of the power input. In this case, the control unit can measure the power input and control the plasmalysis apparatus in such a way that a surge gas pulse is emitted from the opening of the plasma electrode as soon as the power input falls below the threshold value. This can facilitate a more efficient operation of the plasmalysis apparatus. Furthermore, it can prevent the plasma electrode and/or the reaction chamber from being clogged with solid byproduct.

Alternatively, or additionally, surge gas pulses can also be emitted from additional openings and/or nozzles to remove solid by-product from the reaction chamber. This makes it possible to remove solid by-product from the reaction chamber, thereby cleaning the reaction chamber.

The non-grounded non-metallic wall of the gas-tight reaction chamber can include a ceramic or be formed by a ceramic, for example. Macor may be used as the ceramic, for example with a chemical composition of 46% $SiO_2$, 17% MgO, 16% $Al_2O_3$, 10% $K_2O$, 7% $B_2O_3$, 4% F, in which mica is incorporated into a borosilicate glass matrix. The wall can also consist of quartz glass or include quartz glass, for example.

The wall of the reaction chamber can also have a metallic outside and a non-metallic electrically-insulating inside. The non-metallic electrically-insulating inside can consist of Teflon, for example.

The wall can have a wall thickness of at least 4 mm, for example.

A cross-section of the reaction chamber can be enlarged in the direction from the gas supply line to the gas discharge line. This can reduce the adherence of solid by-product on the inside of the wall. Furthermore, it can reduce turbulence in the reaction chamber and facilitate better discharging of molecular hydrogen and by-product. The reaction chamber can be funnel-shaped, for example. The opening of the plasma electrode can be arranged at a medium height of the reaction chamber, for example.

The plasmalysis apparatus can have a discharge line for at least one solid by-product from the reaction chamber. Solid by-products can be in powder form, for example. The removal of solid by-products from the reaction chamber can improve process efficiency since they can then no longer interfere with the cracking process. For example, if the hydrogen-containing gas is methane, a solid by-product can be carbon powder, and if the hydrogen-containing gas is hydrogen sulfide, a solid by-product can be sulfur powder.

The gas discharge line for the molecular hydrogen can be arranged in the flow direction of the hydrogen-containing gas or transversely to it, for example. The gas discharge line for the molecular hydrogen can also be designed to remove gaseous by-products from the reaction chamber. The gas discharge line can further be designed to remove solid by-product carried in the gas flow, for example in the form of particles, from the reaction chamber.

The reaction chamber can have a main chamber and a secondary chamber. The plasma electrode can be arranged relative to the main chamber in such a way that the corona discharge ignites in the main chamber. The secondary chamber can be arranged above the main chamber so that solid by-product can flow into the secondary chamber. This way, the solid by-product, for example in the form of particles, can be discharged from the reaction chamber with the gas flow that consists of molecular hydrogen and gaseous by-product. Alternatively, the secondary chamber can also be arranged below the main chamber so that solid by-product can fall down into the secondary chamber.

This means that, during operation of the plasmalysis apparatus, the secondary chamber can be further from or closer to the earth's center of gravity than the plasma electrode.

Thus, the secondary chamber can be located further from or closer to the earth's center of gravity than the location of the corona discharge. Solid by-product generated during the corona discharge can fall down into the secondary chamber aided by the earth's gravitational pull, if the secondary chamber is closer to the earth's center of gravity during operation of the plasmalysis apparatus. If, during operation of the plasmalysis apparatus, the secondary chamber is further away from the earth's center of gravity than the plasma electrode, the gas discharge line is preferably arranged opposite the opening of the plasma electrode so that solid by-product generated during the corona discharge is removed from the reaction chamber with the gas flow into the gas discharge line. This makes it possible to easily remove solid by-product from the main chamber so that it cannot interfere with the corona discharge.

The secondary chamber can be connected to the discharge line for the at least one solid by-product so as to discharge the solid by-product from the reaction chamber. This facilitates picking up solid by-product from the secondary chamber and removing it from there by means of the discharge line. If the solid by-product is carbon, for example, the secondary chamber can serve as the carbon trap.

The secondary chamber, the gas discharge line and/or the discharge line can feature a discharge device for discharging by-product. The discharge device can be designed to remove solid by-product from the reaction chamber in such a way that no gas can enter the reaction chamber through it. The discharge device can include a flap, an eccentric, an auger, a rotary valve, or another type of discharge device, for example. An overpressure that prevents the intrusion of gas into the discharge device can be generated in the discharge device. A pump can be provided for this purpose. This can facilitate removal of the solid by-product from the plasmalysis apparatus without letting any gas enter the reaction chamber from the outside.

In one embodiment having a flap as the discharge device, this flap is preferably arranged at a fork in the gas discharge line and designed to discharge the gas flow from the reaction chamber into either one or the other line connected to the fork. The flap closes one of the lines for this purpose. For example, the flap can be arranged on a controllable joint so that the flap closes one or the other line depending on whether a surge gas pulse is emitted from the opening of the plasma electrode. This can make it possible to separate solid byproduct, which is being discharged from the reaction chamber by means of a surge gas pulse, from the molecular hydrogen being generated during the corona discharge.

Additionally, or alternatively, the discharge device can also have one or several pressure-controlled particle filters that are designed to absorb solid by-product and discharge it in case of an abrupt pressure change. The abrupt pressure change can be generated by means of a surge gas pulse, for example. This can enable better separation of solid byproduct from molecular hydrogen.

The main chamber and the secondary chamber can be enclosed by different parts of the reaction chamber. The part of the reaction chamber enclosing the main chamber can be made of quartz glass, for example. The part of the reaction chamber can be a housing component. This can facilitate observing the reaction taking place in the reaction chamber.

The part of the reaction chamber enclosing the main chamber can have a wall thickness of at least 4 mm, for example.

The inside of the wall of the secondary chamber can have a higher electrostatic potential than the inside of the wall of the main chamber. This way solid by-products can be attracted from the main chamber into a direction of the secondary chamber.

The gas discharge line for the molecular hydrogen can be arranged above the plasma electrode. Preferably, the gas discharge line for the molecular hydrogen is arranged above the plasma electrode if the hydrogen-containing gas is fed into the reaction chamber through the opening of the plasma electrode. The gas discharge line for the molecular hydrogen can thus be arranged further from the earth's center of gravity than the plasma electrode, and therefore be located further from the earth's center of gravity than the location of the corona discharge. This makes it easier to separate gaseous and solid components that are generated during the corona discharge. Preferably, the gas discharge line for the molecular hydrogen is arranged in a flow direction of the hydrogen-containing gas.

This can improve draining of the molecular hydrogen being generated. This is the case, for example, if the hydrogen-containing gas is fed into the reaction chamber through the opening of the plasma electrode and the gas discharge line for the molecular hydrogen is arranged opposite the plasma electrode.

A distance from the wall of the reaction chamber to the plasma electrode can be at least 40 mm, preferably more than 80 mm, for example. In this case, the distance from the wall of the reaction chamber to the plasma electrode is the smallest distance between an inside of the wall of the reaction chamber to an outer diameter of the plasma electrode. Alternatively, or additionally, the distance from the wall of the reaction chamber to the tip of the plasma electrode can be at least 40 mm. Alternatively, or additionally, a distance from the gas discharge line to the plasma electrode can be at least 60 mm. This makes it possible to provide electrical insulation so that flashovers between the plasma electrode and other potentials, such as the wall of the reaction chamber or the housing, can be prevented. It can further make it possible to reduce the accumulation of solid by-product in the reaction chamber since there is sufficient space to collect solid by-product and discharge it.

The plasmalysis apparatus can be designed to introduce hydrogen-containing gas into the reaction chamber at a flow rate of between 1 l/min and 100 l/min, for example at a flow rate of 2 l/min. The higher the flow rate, the better the plasmalysis apparatus is able to remove solid agglomerating structures of the by-product from the reaction chamber. In particular, if the hydrogen-containing gas contains methane, an increase in the flow rate will result in more solid carbon structures being discharged from the reaction chamber. However, a higher flow rate will, above a certain flow rate, reduce process efficiency or the yield of molecular hydrogen. The plasmalysis apparatus can be designed to set a flow rate so that the hydrogen yield is optimized.

The reaction chamber can feature a cleaning element for the removal of solid by-product. The cleaning element facilitates the removal of solid by-product that can accumulate in the reaction chamber during operation of the plasmalysis apparatus. This makes it possible to prevent or at least reduce any disruptive influence of the solid by-product on the corona discharge. For example, when the plasmalysis apparatus is in operation, tree-like structures or long spikes, for example graphite spikes, can develop from the solid by-product, and solid by-product can accumulate on the inside of the wall of the reaction chamber. The tree-like structures or long spikes can develop on a tip of the plasma electrode and temporarily become part of the plasma electrode, for example. The cleaning element can mechanically remove such disruptive solid by-products that cannot be removed with a higher flow rate through the gas supply line.

The reaction chamber can also have several cleaning elements. For example, one cleaning element can be for removing solid by-product from the inside of the wall of the reaction chamber, and one cleaning element can be for removing solid by-product from the plasma electrode. This can facilitate better removal of solid by-product from the reaction chamber. Furthermore, a cleaning element for removing solid by-product from the plasma electrode can facilitate a continuous production process for molecular hydrogen, since surge gas pulses that temporarily interrupt the production process are not required for removing the by-product. The cleaning element can be moved by the corona discharge or the plasma, for example.

The cleaning element can be arranged on an inside of the wall of the reaction chamber to remove the at least one solid by-product from the reaction chamber. For example, the cleaning element can be movable, e.g. displaceable, along the inside of the wall of the reaction chamber. This can facilitate the mechanical removal of solid by-products that form in the reaction chamber during the corona discharge and accumulate on the inside of the wall of the reaction chamber. The cleaning element can have a notch or an opening in its center that is larger in diameter than the outer diameter of the plasma electrode. This can make it possible for the cleaning element to be movable along the entire length or height of the reaction chamber.

Alternatively, or additionally, the cleaning element can also have a rotational element to rotate the plasma electrode around a common longitudinal axis relative to the wall of the reaction chamber. Slide seal rings can be provided between the walls of the reaction chamber and the plasma electrode for this purpose. The cleaning element can break up the solid by-product structures, which can extend from the plasma electrode to the inside of the wall of the reaction chamber, by way of rotation. A relative rotation of the plasma electrode towards the wall of the reaction chamber during the corona discharge can also prevent these structures from even developing.

Alternatively, or additionally, the cleaning element can also be arranged on the plasma electrode and be displaceable relative to the plasma electrode around its longitudinal axis. This can facilitate removal of solid by-product from the plasma electrode. The cleaning element itself can be displaceable and/or the plasma electrode can be rotatable around its longitudinal axis so that the cleaning element is displaceable relative to the plasma electrode. The cleaning element can also be fixed at its position if the plasma electrode is rotatable around its longitudinal axis. The cleaning element can have a scraper or an edge for mechanically removing solid by-product. This can facilitate easier mechanical removal of solid by-product.

The cleaning element can also have one or several nozzles for blowing out the reaction chamber. The reaction chamber can be blown out with a surge gas pulse, for example. To this end, hydrogen-containing gas or a different gas, for example inert gas, can be supplied to the nozzle or nozzles. The nozzles can be arranged in the wall of the reaction chamber, in particular on its inside, for example. This can improve the removal of by-product, in particular solid by-product, from the reaction chamber. The cleaning element can also comprise an ultrasound cleaning device that is designed to make the gas oscillate in the vicinity of solid by-product that has accumulated in the reaction chamber, so as to remove it from the reaction chamber.

The control unit of the plasmalysis apparatus or the control unit connected to the plasmalysis apparatus can be designed to control parameters of the plasmalysis apparatus, such as a flow rate of the hydrogen-containing gas, a temperature of the hydrogen-containing gas, a temperature in the reaction chamber, a temperature of the plasma electrode, a pressure in the reaction chamber, a voltage level of the alternating voltage, a frequency of the alternating voltage, a current intensity, a gas cooling rate of the hydrogen-containing gas, a gas cooling rate of the gas mix generated by the corona discharge, a frequency of the corona discharges, or other parameters of the plasmalysis apparatus. In particular, the control unit can be designed to control the parameters of the plasmalysis apparatus depending on a composition of the hydrogen-containing gas.

The plasmalysis apparatus can comprise one or several analysis devices for analyzing the hydrogen-containing gas, the molecular hydrogen, and the at least one by-product. The analysis devices can be arranged upstream from, downstream from, or in the gas supply line and/or the gas discharge line. This facilitates the analysis of the gas flows fed into the plasmalysis apparatus and those discharged from the reaction chamber. The control unit can be designed to control the parameters of the plasmalysis apparatus according to the composition of the gas flows. For example, volume measuring devices, methane sensors, hydrogen sensors, Raman spectrometers, and/or mass spectrometers can be arranged upstream and downstream from the plasmalysis apparatus.

The plasmalysis apparatus can comprise a temperature control element, for example a heating element and/or a cooling element, for the reaction chamber to set a temperature in the reaction chamber. Changing the temperature in the reaction chamber can facilitate an increase in the hydrogen yield. The reaction chamber is preferably neither cooled nor heated so that, as a general rule, it is at ambient temperature before a corona discharge takes place.

The plasmalysis apparatus can be designed to use heat, which was generated in the reaction chamber through heating, for pyrolysis. This allows for additional cracking of the hydrogen-containing gas by means of a pyrolysis reaction. Alternatively, or additionally, the heat can also be dissipated. For example, the heat can be removed from the reaction chamber together with the molecular hydrogen and/or gaseous by-product via the gas discharge line. Heat exchangers can then be used to utilize the heat for another purpose, for example for heating buildings. The heat can be used in a heating system, for example. The heat can also be used in a furnace, for example a heating furnace. The heating furnace can, for instance, be intended for producing building materials, for example tiles, in particular roofing tiles. This can improve the carbon footprint of building materials since the heat is produced without carbon dioxide.

Additionally, or alternatively, the plasmalysis apparatus can feature an electrode temperature control element, for example an electrode cooling element, for the plasma electrode for setting a temperature of the plasma electrode. The plasma electrode can, for example, be set to a temperature in the range of 60° C. and 400° C., e.g. between 60° C. and 70° C. or between 350° C. and 400° C.

The plasmalysis apparatus can comprise a pump for adjusting the pressure in the reaction chamber. Changing the pressure in the reaction chamber can facilitate an increase in the hydrogen yield. Preferably, there is ambient pressure in the reaction chamber before the hydrogen-containing gas is introduced.

The plasmalysis apparatus can also comprise a supply line for inert gas. Alternatively, the inert gas can also be fed into the reaction chamber together with the hydrogen-containing gas via the gas supply line for the hydrogen-containing gas. The inert gas can be nitrogen and/or one or several noble gases, such as helium or argon, for example. The inert gas can increase the reaction rate since more electrons and photons are available for the corona discharge. The inert gas can also support cleaning of the reaction chamber.

The wall of the reaction chamber can be made of a heat-resistant material for temperatures of e.g. at least 800° C.; walls containing graphite, which are heat-resistant up to 2500° C., are preferably used. The wall can also contain several materials that are preferably all heat-resistant up to at least 800° C. Additionally, the material or the materials can be dimensionally stable. The wall of the reaction chamber can comprise a thermal insulation. This can facilitate the provision of a heat-resistant and dimensionally stable wall for the reaction chamber. In addition, this type of wall can contribute to improved conversion of hydrogen-containing gas.

The wall of the reaction chamber can be pressure-resistant, for example up to 10 bar overpressure. Preferably, the wall of the reaction chamber is designed in such a way that it withstands constant overpressure of up to 10 bar. It is particularly preferred that the wall of the reaction chamber is designed in such a way that it also withstands surge gas pulses with higher pressures in excess of 10 bar.

The plasmalysis apparatus can comprise electrical insulation as protection against flashovers between the plasma electrode and another potential, such as the wall of the reaction chamber or the housing. Electrical insulation can be ensured by the distance of the plasma electrode from the inside of the wall of the reaction chamber, for example.

The reaction chamber can comprise a catalyst, for example nickel, iron, ruthenium, cobalt, or platinum.

The plasmalysis apparatus can comprise a particle filter for filtering out particles. The particle filter is preferably arranged in the gas supply line for the hydrogen-containing gas for filtering out particles from the hydrogen-containing gas upstream of the reaction chamber. This can help reduce particle contamination in the gas flow, which can result in undesirable by-products. The plasmalysis apparatus can also comprise several particle filters. Preferably, one of the particle filters is arranged in the gas discharge line to filter out particles from the gas flow that is guided out of the reaction chamber into the gas discharge line.

The plasmalysis apparatus can comprise one or several membranes and/or one or several adsorbers for filtering out gaseous by-product from a gas flow of the gas discharge line for the molecular hydrogen. These can be arranged within the gas discharge line for the molecular hydrogen or at one end of the gas discharge line for the molecular hydrogen, for example. Polymer membranes for separating molecular hydrogen and gaseous by-product can be used, for example. Ceramic materials with a large surface area and high adsorption capacity can be used as adsorbers for a respective gaseous by-product, for example, in particular so-called molecular sieves. Aside from zeolites, i.e. crystalline aluminosilicates, these can also be carbon molecular sieves. Silica gel or activated aluminum oxide can be used as adsorbers, for example. Zeolite Socony Mobil-5 (ZSM-5), a synthetic high-silica aluminosilicate zeolite, can also be used as an adsorber, for example. This facilitates the separation of gaseous by-product from the molecular hydrogen. In addition, the gaseous by-product can again be fed into the reaction chamber via the supply line. This can increase the yield of molecular hydrogen.

The membrane or the selective adsorber can also be selectively introduced into the gas discharge line for the molecular hydrogen so as to adjust a composition of the gas flow passing through the gas discharge line for the molecular hydrogen. For example, any methane that intentionally remains in the gas flow can be mixed with the molecular hydrogen at a specified ratio in accordance with the requirements for a methane-hydrogen fuel. This can make it possible to provide a synthetic fuel, in particular a synthetic gas.

The plasmalysis apparatus can comprise a reservoir. The reservoir may be connected to the gas discharge line for the molecular hydrogen. The one or several membranes can be arranged in the reservoir. The adsorber can also be arranged in the reservoir. The adsorber can be arranged in the reservoir in the form of a fill or an open-pore foam, for example. The adsorber for separating molecular hydrogen and gaseous by-product is advantageously designed in such a way that gaseous by-product is bound to it, preferably by way of adsorption. However, combinations of membranes and adsorbers can also be used for different gaseous by-products that form. Polymer membranes, for example, separate $CO_2$ and $CH_4$ and $N_2$ well, but zeolites, like ZSM-5, can also be used.

The reservoir can feature a releasing device for releasing the adsorbed gaseous by-product. For example, it can be designed in the form of a heater for thermally releasing the gaseous by-product, or in the form of a vacuum pump for applying negative pressure. However, the reservoir can also have a sealable opening through which the loaded adsorber can be replaced with an unloaded adsorber after adsorption.

The plasmalysis apparatus can be used in stationary structures or mobile structures. Stationary structures are, for example, stationary buildings or plants, such as stationary biogas reactors or stationary wastewater treatment plants. Mobile structures are, for example, mobile buildings, drilling platforms, and vehicles, such as airplanes, trucks, passenger cars, trains, or ships, in particular cruise ships.

According to a further aspect, the present disclosure relates to a plasmalysis system for the corona discharge-induced cracking of hydrogen-containing gas into molecular hydrogen and at least one by-product. The plasmalysis system comprises at least two plasmalysis apparatuses according to one of claims 1 through 6 or one embodiment of the plasmalysis apparatus. The plasmalysis apparatuses are arranged in parallel or in series. For example, the plasmalysis apparatuses can be arranged in series, whereby at least one gas discharge line of an upstream plasmalysis apparatus is connected to a gas supply line of a downstream plasmalysis apparatus. This can make it possible to arrange several plasmalysis apparatuses in a row so as to facilitate complete cracking of the hydrogen containing gas. In particular, the reaction chambers of the plasmalysis of apparatuses can be interconnected this way. The plasmalysis apparatuses can, for example, also be arranged in a circular manner, i.e. in such a way that the plasmalysis apparatuses form a ring, so that one gas discharge line of an upstream plasmalysis apparatus is connected to a gas supply line of a downstream plasmalysis apparatus. A gas discharge line out of the plasmalysis system can be provided in the plasmalysis system to discharge the molecular hydrogen from the plasmalysis system. In the case of a ring-shaped plasmalysis system, the gas discharge line out of the plasmalysis system is an additional gas discharge line aside from the respective gas discharge line that is connected to the gas supply line of the downstream plasmalysis apparatus in each case.

The plasmalysis system enables scaling of the corona discharge-induced cracking of hydrogen-containing gas into molecular hydrogen and at least one by-product. Any number of plasmalysis apparatuses can be operated in parallel to obtain large amounts of hydrogen from hydrogen-containing gas.

The plasmalysis apparatuses of the plasmalysis system can be controlled by means of a common control unit.

The common control unit can be designed to control the parameters of the plasmalysis apparatus, in particular depending on a composition of the hydrogen-containing gas. The plasmalysis system can comprise one or several analysis devices. The analysis devices can be arranged and designed to analyze the composition of the gas flows that are fed into or discharged from the plasmalysis system. The analysis devices can, additionally or alternatively, be arranged and designed to analyze the composition of the gas flows that are fed into or discharged from the individual plasmalysis apparatuses of the plasmalysis system.

The plasmalysis system can comprise a temperature control unit to set a temperature of the hydrogen-containing gas. The temperature control unit can comprise a heat exchanger and/or a cooling unit, for example. This allows for preheated hydrogen-containing gas to be fed into the reaction chamber or the gas supply line. Furthermore, hydrogen-containing liquids can be converted into the gaseous aggregate state. The temperature control unit can be arranged on the outside of the plasmalysis apparatuses or be part of one or several of the plasmalysis apparatuses. The temperature control unit can be arranged in one of the gas supply lines for the hydrogen-containing gas, for example.

The plasmalysis system can comprise one or several fans for adjusting the flow rate through the plasmalysis apparatuses.

The plasmalysis system can comprise one or several radiation sources, for example ultraviolet (UV) radiation sources. They can facilitate improved control of the ignition of the corona discharge. For this purpose, the radiation source can be arranged in such a way that the radiation source can introduce its radiation at the corona discharge location. Even without a radiation source, high-energy UV radiation, which can assist in the cracking of additional molecular bonds, can be generated during the corona discharge.

The plasmalysis system can comprise one or several high-frequency generators. These can be designed to provide a high-frequency alternating voltage for a plasma electrode of the respective plasmalysis apparatus.

The plasmalysis system can comprise a storage unit containing a substance that can be used to generate hydrogen-containing gas, for example a storage unit with composted material or a tank with kerosene, JP-8, crude oil, gasoline, or diesel. Additionally, or alternatively, the plasmalysis system can feature a storage unit with hydrogen-containing gas.

Additionally, or alternatively, the plasmalysis system can have an energy system for providing energy for the corona discharge-induced cracking of hydrogen-containing gas into molecular hydrogen and the at least one by-product. Additionally, or alternatively, the plasmalysis system can have a hydrogen storage unit for storing the molecular hydrogen. Additionally, or alternatively, the plasmalysis system can feature a drive that can be operated with molecular hydrogen, for example a hydrogen-powered combustion motor.

Additionally, or alternatively, the plasmalysis system can have an energy system that can be operated with molecular hydrogen.

The storage unit with hydrogen-containing gas can be connected to one or several of the plasmalysis apparatuses. In particular, the storage unit with hydrogen-containing gas can be connected to a gas supply line of one or several of the plasmalysis apparatuses. The storage unit with hydrogen-containing gas can be connected to or part of a biogas reactor, a wastewater treatment plant, or a natural gas storage unit.

The energy system for providing energy for the corona discharge-induced cracking of hydrogen-containing gas can be connected to the high-frequency generator or high-frequency generators to provide a high-frequency voltage for the plasma electrodes. The energy system for providing energy can be an energy system for producing renewable energy, such as a wind energy plant, a solar energy plant, a hydroelectric power plant, or a biogas power plant.

The energy system that can be operated with molecular hydrogen can be connected to the hydrogen storage unit or to at least one of the plasmalysis apparatuses. The energy system that can be operated with molecular hydrogen can, for example, comprise a fuel cell or a combined heat and power plant (CHP). For example, the molecular hydrogen can be used for generating heat, for instance by using the molecular hydrogen in a hydrogen-powered CHP to generate heat.

The plasmalysis system can facilitate emission-free generation of energy. If biogas or biomethane from biogas is used as the hydrogen-containing gas, it is even possible to generate a carbon dioxide sink so as to sustainably reduce carbon dioxide in the air and in particular in the atmosphere. Biogas or biomethane from biogas can be provided by a biogas reactor, for example. For this purpose, waste, such as food waste, liquid manure, dung, and renewable raw materials, e.g. plants or plant parts, can be converted into biogas in the biogas reactor, for example.

The plasmalysis system can be used in a stationary structure or in a mobile structure, in particular in a vehicle.

According to a further aspect, the present disclosure relates to the utilization of a plasmalysis apparatus according to one of claims 1 through 6 or an embodiment of the plasmalysis apparatus for the cracking of hydrogen-containing gas into molecular hydrogen and at least one by-product by using the hydrogen-containing gas provided through the operation of a stationary structure or mobile structure.

Instead of one plasmalysis apparatus, it is also possible to use several plasmalysis apparatuses or a plasmalysis system according to claim 7 or 8 or a different embodiment of the plasmalysis system for the cracking of hydrogen-containing gas into molecular hydrogen and at least one by-product by using the hydrogen-containing gas provided through the operation of a stationary structure or mobile structure.

The hydrogen-containing gas can be provided by a stationary structure, such as a stationary biogas reactor or a stationary wastewater treatment plant, for example. The plasmalysis apparatus can also be used to provide molecular hydrogen for an energy system that can be powered with molecular hydrogen, such as a fuel cell or a CHP, for example. The plasmalysis apparatus can be used in a hotel, a shopping center, a store, a factory, or in a different building, for example.

The hydrogen-containing gas can also be provided by a mobile structure, such as a vehicle, for example. In other words, the plasmalysis apparatus can also be used in a vehicle. For instance, a vehicle, e.g. a cruise ship, can comprise a wastewater treatment station for providing hydrogen-containing gas, e.g. biogas or biomethane from biogas. The hydrogen-containing gas can also be provided by other vehicles, for example a passenger car or a truck. For this purpose, gasoline or diesel can be converted into the gaseous aggregate state that can then be supplied to the plasmalysis apparatus, for example. The molecular hydrogen can also be stored in a storage unit, for example a hydrogen storage unit, to use it as fuel for vehicles, for example for freight or passenger transport. The plasmalysis apparatus can further be used to convert biogas, biomethane from biogas, or natural gas into molecular hydrogen and at least one by-product. In this case, energy from a renewable energy source, such as a wind energy plant, a solar energy plant, or a hydroelectric power plant, can be supplied to the plasmalysis apparatus.

The by-product generated during cracking of hydrogen-containing gas can contain carbon, for example. The by-product may contain various carbon structures that can be used in the construction sector, the electronics industry, and in lightweight construction. In addition, the carbon structures can also be used for paints and lacquers and for tire production.

The molecular hydrogen and the at least one by-product can be intermediate products that are further processed into a downstream product in additional process steps or production steps. The downstream product can be a further intermediate product or a final product.

According to a further aspect, the present disclosure relates to the utilization of the molecular hydrogen and/or the at least one by-product produced by the plasmalysis apparatus according to one of claims 1 through 6 or another embodiment of the plasmalysis apparatus.

Which downstream products can be produced on the basis of the molecular hydrogen and/or the at least one by-product produced by the plasmalysis apparatus will depend, inter alia, on the by-products produced and the hydrogen yield achieved. This will, in turn, depend on which elements the hydrogen-containing gas contains at what concentrations. The hydrogen-containing gas can also contain carbon in addition to hydrogen, for example. In addition, the hydrogen-containing gas can also contain nitrogen or noble gases. Nitrogen or a noble gas can also be fed into the reaction chamber in addition to the hydrogen-containing gas, for example via one of the additional gas supply lines.

The hydrogen-containing gas can contain methane ($CH_4$), for example. In this case, the at least one by-product can contain carbon structures, for example carbon agglomerates. High-quality carbon structures can be produced when methane is passed through the plasma. The quality of the carbon structures will also depend on the parameters of the plasmalysis apparatus during the production process. With a lower energy input, smaller carbon agglomerates are produced and a higher hydrogen yield is achieved, for example. Smaller carbon agglomerates are carbon structures with smaller particle sizes in the agglomerates, for example in the range of particle sizes smaller than 200 m, preferably smaller than 20 μm, which can be used as additives, for example. With a higher energy input and a lower flow rate of the hydrogen-containing gas, for example, it is possible to produce higher-quality carbon structures, for example graphite, e.g. in the form of graphite spikes. However, in this case the hydrogen yield is reduced, for example to 20%, compared to a maximum hydrogen yield.

The properties of the carbon agglomerates will depend, inter alia, on the particle size of the primary particles and on the particle size of the carbon agglomerates formed by the primary particles. As the particle size of the primary particles is reduced, the viscosity increases, the dispersibility decreases, the electrical conductivity increases, the color intensity increases, and the hue turns browner. As the particle size of the carbon agglomerates is reduced, the viscosity decreases, the dispersibility decreases, the electrical conductivity decreases, the color intensity increases, and the hue turns browner.

Which by-products with which properties are produced depends, in particular, on the pressure, temperature, power, frequency and residence time of the hydrogen-containing gas in the plasma. The power depends on the current intensity and voltage. The medium particle size depends strongly on the current intensity at a fixed voltage, for example.

The by-product may contain more than 95 weight percent of carbon particles, for example. The medium particle size of the carbon agglomerates can be between 7.7 m and 105 μm, for example. The carbon particles can form carbon agglomerates that, together, can form a porous solid. The pore radii of the porous solid can be between 0.18 nm and 1.7 nm, for example. Pore volumes can be between 0.016 and 0.037 cc/g, for example.

The by-product may be in the form of a porous solid. The by-product can have a surface area of between 50 $m^2/g$ and 2000 $m^2/g$, determined according to BET measurement. The by-product can contain soot, in particular carbon black, for example. The soot can have a dibutyl phthalate absorption (DBPA), measured according to DIN 53601: 1978-12 of between 30 and 130 ml/100 g and an iodine value of 10 to 160 mg/g, for example.

If natural gas is used as the hydrogen-containing gas at a flow rate of approx. 2 l/min., carbon structures with particle sizes of the agglomerates of approx. 20 m and particle sizes of the primary particles of approx. 60 nm with a specific surface area of 87 $m^2/g$ can be produced as by-products, for example. If associated petroleum gas is used as the hydrogen-containing gas at a flow rate of approx. 2 l/min., carbon structures with particle sizes of the agglomerates of approx. 160 m and particle sizes of the primary particles of approx. 65 nm with a specific surface area of 120 $m^2/g$ can be produced as by-products, for example. The use of the plasmalysis apparatus facilitates the production of larger agglomerates or aggregates of carbon with smaller primary particle sizes than compared to the commercially available lamp black.

Furthermore, the hydrogen yield also depends on the type of hydrogen-containing gas used. If, for example, pure methane is used as the hydrogen-containing gas, it is possible to produce a gas flow with e.g. 98% molecular hydrogen and 2% methane, subject to the further prerequisite that a hydrogen plasma is being produced. However, if natural gas is used as the hydrogen-containing gas, a lower hydrogen yield is achieved. If associated petroleum gas is used as the hydrogen-containing gas, the hydrogen yield is further reduced since the composition of associated petroleum gas contains fewer hydrogen atoms, and the gas mix contains 10% nitrogen, for example. To increase the hydrogen yield, a cascaded cracking process can be carried out, in which the gas mix is cracked in several steps connected in series, and the different gases are separated.

In other words, the produced molecular hydrogen and the at least one by-product can also be passed through several plasmalysis apparatuses, with each plasmalysis apparatus having different parameters, for example. The temperature in the reaction chamber can be different for each plasmalysis apparatus and/or the plasmas can have different temperatures, for example. Molecular hydrogen that is passed through the plasma can increase the temperature and produce a hot hydrogen plasma, for instance. With the temperature changes, different hydrogen yields can be achieved and by-products, for example with higher-quality structures, can be produced. For example, gas flows being discharged from a first plasmalysis apparatus can also be separated in such a way that only part of the gas flows is fed into the following second plasmalysis apparatus. This can make it possible to produce molecular hydrogen and the at least one by-product in such a way that they are optimized for specific applications or for the production of specific downstream products.

For example, the at least one by-product as a carbon structure in the form of carbon black can have the following different ASTM grades depending on the intended application or intended use: N110, N115, N121, N220, N234, N330, N326, N339, N347, N375, N539, N550 or N650.

Downstream products of the molecular hydrogen can contain, for example, ammonia, acetylene or synthetic gas, such as a syngas HCO mix. The downstream products of the molecular hydrogen can, in turn, be processed into subsequent downstream products in further applications. Ammonia can be used for producing fertilizers, for example. The molecular hydrogen can also be used for energy generation, energy storage, as fuel or for fuel desulfurization, for example.

The downstream products of the at least one by-product also depend on the hydrogen-containing gas. The at least one by-product produced in addition to the molecular hydrogen is dependent upon different parameters of the plasmalysis apparatus during the production process. By adjusting the parameters of the plasmalysis apparatus, it is possible to set a surface area size and clustering of carbon chains, among others, in order to produce different carbon structures, for example different types of carbon black. The carbon structures can also be post-treated with a plasma, e.g. the plasma of the plasmalysis apparatus, to produce new crystalline structures, for example. Several plasmalysis apparatuses can be arranged in series, for example, so that the carbon structures produced in the first plasmalysis apparatus can be post-treated in a second plasmalysis apparatus. Thus, different carbon structures of different forms can be produced. The parameters of the plasmalysis apparatus can be optimized during the production process in such a way that a specific byproduct is produced, e.g. with a specific carbon structure that is optimized for a specific application or for processing into a downstream products.

Downstream products that can be made from the carbon structures or to which the carbon structures can be added as an additive can include, for example, compostable products, such as coffee capsules and containers, or also feed additives, ceramics, improved liquid manure, activated carbon for wastewater treatment, carbon for the extraction of phosphorus and other basic chemicals in sewage sludge, enhanced soil for improved storage of nutrients, carbon binder mixes, for example as a building material substitute or plastic substitute, carbon polymer mixes, carbon biopolymers, carbon silicates, coke, asphalt mixes, cement mixes, concrete mixes, tires, paints, lacquers, black surfaces, batteries, coatings, toners, inks, conductive inks, mechanical rubber products, conveyor belts, cases, closures, plastics, cables, and containers. Certain downstream products can be used for insulation, filtration, packaging, or for lightweight construction, for example.

Another downstream product could be, for example, a methane carbon dioxide mixture ($CH_4+CO_2$) that can be used as a precursor product for the Fischer-Tropsch process for producing kerosene. Downstream products can also contain synthetic fuels that can be synthesized on the basis of the gas flows produced by the plasmalysis apparatus. Synthesis can also be carried out in the plasmalysis apparatus itself, for example at 50 bar. It is also possible to combine cracking steps with synthesis steps. For example, a hydrogen-containing gas can be cracked in the plasmalysis apparatus, and another hydrogen-containing gas can be synthesized in a subsequent step. The other hydrogen-containing gas can additionally contain carbon, for example, and be e.g. a synthetic propellant or a synthetic fuel.

According to a further aspect, the present disclosure relates to the utilization of the molecular hydrogen produced in a plasmalysis apparatus according to claim 1 through 6 or another embodiment of the plasmalysis apparatus, for the following applications:

as fuel
for the production of a hydrogen combustion product
as a propellant
for operating a hydrogen-powered vehicle
for mixing with liquefied petroleum gas
for mixing with liquefied natural gas (LNG)
for mixing with liquefied biomethane (LBM)
for mixing with natural gas
for mixing with methane
for producing synthesis gas
for producing synthetic fuel
for producing ammonia that can be used for the production of fertilizers
for refining crude oil
for hydrogenation of chemical compounds
for operating a hydrogen turbine
for operating a fuel cell
for operating a combined heat and power generation (CHP)
for operating a combined heat and power system
for generating energy by means of a fuel cell
for generating energy and/or heat by means of combined heat and power generation
in a gas separation system
in a gas compression system
for producing synthetic raw materials
for storing energy
for generating heat
for generating energy.

Protection is only claimed for the molecular hydrogen actually produced with the plasmalysis apparatus. In other words, this concerns precisely the situation in which the molecular hydrogen is produced in the plasmalysis apparatus and then used, namely by using it for a specific application, for example.

According to a further aspect, the present disclosure relates to the use of by-product produced in a plasmalysis apparatus according to claims 1 through 6 or another embodiment of the plasmalysis apparatus, for the following applications:

as a reducing agent in the production of steel
as fuel
as an adsorbent, for example in the chemical industry, in medicine, drinking water treatment, wastewater treatment, ventilation technology or air-conditioning technology
as substrate of catalysts for heterogeneous catalysis
as base material in the production of carbon structures
as additive in the production of asphalt
as additive in the production of cement as additive in the production of concrete
as an ingredient in a thermally conductive agent, for example a thermally conductive paste
as activated carbon for wastewater treatment
as a feed additive
as a binder additive
as an additive to the soil for improved storage of nutrients
as carbon for extracting phosphorous and other basic chemical substances in sewage sludge
as an additive in building materials
as an additive in plastics
for insulation
for filtration
for packaging
for lightweight construction.

The by-product can also be used in the steel industry, e.g. in blast or cupola furnaces, for example. Protection is only claimed for the by-product actually produced with the plasmalysis apparatus. In other words, this concerns precisely the situation in which the by-product is produced in the plasmalysis apparatus and then utilized, namely by using it for a specific application, for example.

According to a further aspect, the present disclosure relates to a method for the corona discharge-induced cracking of hydrogen-containing gas into molecular hydrogen and at least one by-product, or for the production of molecular hydrogen and at least one by-product, or for the production of downstream products from the molecular hydrogen and/or the at least one by-product. The method comprises the following process steps:

Feeding a hydrogen-containing gas into a gas-tight reaction chamber;
Generating a corona discharge in the reaction chamber by means of exactly one plasma electrode operated with a high-frequency alternating voltage, whereby the gas-tight reaction chamber is enclosed by a wall which is designed to electrically insulate the plasma electrode from an outside of the wall, and whereby molecular hydrogen and the at least one by-product are produced by the corona discharge.

The method can comprise the following step: Discharging the molecular hydrogen and the at least one by-product from the reaction chamber.

The molecular hydrogen can subsequently be separated from the at least one by-product by means of gas separation, for example. The gas separation can comprise physical separation methods. For example, gas separation methods, such as the Linde method, membrane methods, gas separation by means of gas centrifuges, gas separation by means of gas chromatographs, such as high-performance liquid chromatography (HPLC), adsorption methods, such as pressure swing adsorption, or other gas separation methods, can be used in order to separate the molecular hydrogen and the at least one by-product. The gas separation methods can also be used to separate different by-products. The gas mix discharged from the reaction chamber can also be separated into individual gases in a cascade of consecutively performed gas separations.

The method can comprise one or several of the following steps:

Separation of the molecular hydrogen from the at least one by-product;
Using the molecular hydrogen and/or the at least one by-product in a subsequent application; and
Using the molecular hydrogen and/or the at least one by-product for producing a downstream product;
Converting the molecular hydrogen and/or the at least one by-product into a downstream product;
Using the molecular hydrogen and/or the at least one by-product in a method for generating heat and/or energy.

The molecular hydrogen and/or the at least one by-product can be burned, for example, in order to generate heat and/or energy.

The hydrogen-containing gas can be fed into the reaction chamber via a gas supply line for the hydrogen-containing gas. The high-frequency alternating voltage can be supplied to the plasma electrode by a high-frequency generator. The molecular hydrogen can be discharged from the reaction chamber via a gas discharge line for the molecular hydrogen.

The hydrogen-containing gas can be fed into the reaction chamber through an opening of the plasma electrode.

The hydrogen-containing gas can contain methane and/or hydrogen sulfide. The hydrogen-containing gas can also contain natural gas, associated petroleum gas, natural gas, ammonia, and/or biogas, for example. Alternatively, or additionally, the hydrogen-containing gas can also contain cyclohexane, heptane, toluene, gasoline, JP-8, and/or diesel that have been converted into the gaseous aggregate state. If the hydrogen-containing gas contains biogas, a process-related carbon dioxide sink can be generated. This can remove carbon dioxide from the air faster than reforestation of forests, for example.

The method can comprise the following step:
Filtering the by-product from a gas flow of molecular hydrogen and by-product.

The by-product can contain solid by-product, for example in the form of particles. The solid by-product can be filtered by means of a particle filter, for example. In addition, the byproduct can contain gaseous by-product that can be filtered by means of a membrane or an adsorber, for example.

The method can comprise the following steps:
Collecting gas that forms in the gas discharge line for the molecular hydrogen and/or a reservoir for the molecular hydrogen as a result of the cracking of hydrogen-containing gas;
Separating the generated gases by way of a multi-stage membrane process, using selective adsorption methods and/or one or several other gas separation methods.

This facilitates an easy separation of the occurring gases and thereby also the collection of molecular hydrogen and gaseous by-product. Alternatively, other gas separation methods can also be used.

In a selective adsorption method, for example, the gas forming as a result of the cracking of hydrogen-containing is passed through a reservoir which has at least one adsorber. One type of gas of a gaseous by-product can be bound to it by way of adsorption, for example.

Another type of gas, for example the molecular hydrogen, can thus be released alone initially. The adsorbed gas type can then be released from the adsorber in a further step, for example by means of pressurization or thermal release.

The method can comprise the step:
Discharging solid by-product from the reaction chamber.

The solid by-product can be discharged from the reaction chamber via a discharge line for solid by-product, for example. For this purpose, a discharge device can be provided, for example.

The method can comprise the following step:
Cleaning of the reaction chamber to remove solid by-product from the reaction chamber.

The cleaning of the reaction chamber can, in particular, comprise mechanical removal of solid by-product, for example by means of a cleaning element or by blowing out the reaction chamber with gas pulses.

According to a further aspect, the present disclosure relates to the utilization of the molecular hydrogen that can be or is produced according to the method pursuant to claim 13 or an embodiment of the method, for one of the following applications:
as fuel
for the production of a hydrogen combustion product
as a propellant
for operating a hydrogen-powered vehicle
for mixing with liquefied petroleum gas
for mixing with liquefied natural gas
for mixing with liquefied biomethane
for mixing with natural gas
for mixing with methane
for producing synthesis gas
for producing synthetic fuel
for producing ammonia that can be used for the production of fertilizers
for refining crude oil
for hydrogenation of chemical compounds
for operating a hydrogen turbine
for operating a fuel cell
for operating combined heat and power
for operating a combined heat and power plant
for generating energy by means of a fuel cell
for generating energy and/or heat by means of combined heat and power
in a gas separation system
in a gas compression system
for producing synthetic raw materials
for storing energy
for generating heat
for generating energy.

The molecular hydrogen can be used for mobility, e.g. for powering a vehicle, for example. When molecular hydrogen is burned, it generates water. It is thus possible to burn molecular hydrogen for powering different equipment, in particular vehicles, without generating carbon dioxide.

According to a further aspect, the present disclosure relates to the utilization of the at least one by-product that can be or is produced according to the method pursuant to claim 13 or an embodiment of the method, for one of the following applications:
as a reducing agent in the production of steel
as fuel
as an adsorbent, for example in the chemical industry, in medicine, drinking water treatment, wastewater treatment, ventilation technology or air-conditioning technology
as substrate of catalysts for heterogeneous catalysis
as base material in the production of carbon structures
as additive in the production of asphalt
as additive in the production of cement
as additive in the production of concrete
as an ingredient in a thermally conductive agent, for example a thermally conductive paste
as activated carbon for wastewater treatment
as a feed additive
as a binder additive
as an additive to the soil for improved storage of nutrients
as carbon for extracting phosphorous and other basic chemical substances in sewage sludge
as an additive in building materials
as an additive in plastics
for insulation
for filtration
for packaging
for lightweight construction.

Examples of embodiments are also indicated in the claims.

BRIEF DESCRIPTION OF THE FIGURES

In the following, further exemplary embodiments of the device and method will be described based on the drawings. They show the following.

DETAILED DESCRIPTION OF VARIOUS EMBODIMENTS OF THE PRESENT DISCLOSURE

Figure 1:
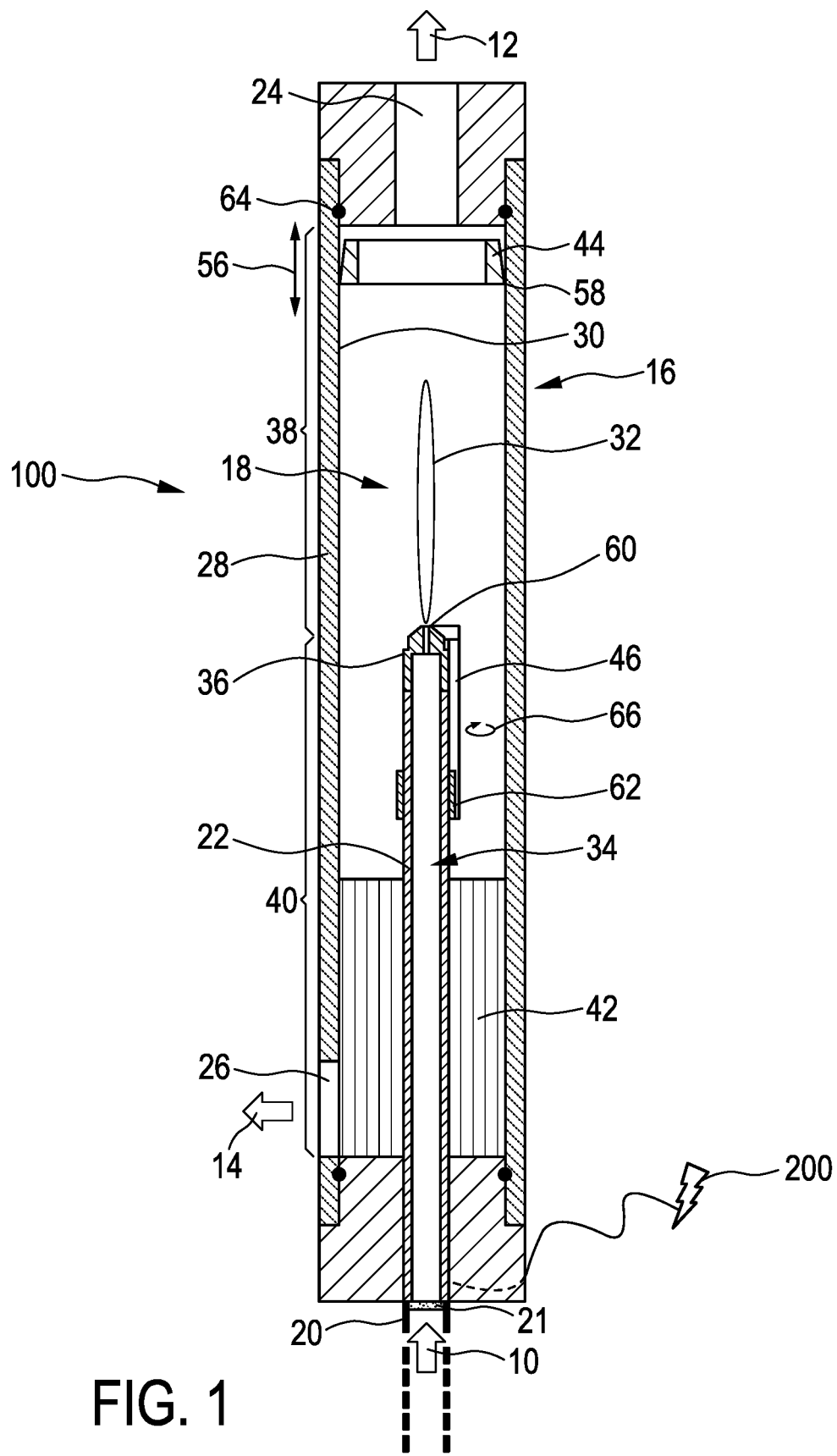
FIG. 1 A schematic depiction of an exemplary embodiment of a plasmalysis apparatus for the corona discharge-induced cracking of hydrogen-containing gas into molecular hydrogen and at least one by-product according to the first aspect of the present disclosure.

FIG. 1 shows a schematic depiction of an exemplary embodiment of a plasmalysis apparatus 100 for the corona discharge-induced cracking of hydrogen-containing gas 10 into molecular hydrogen 12 and at least one by-product 14. In this exemplary embodiment, the by-product 14 is solid. The hydrogen-containing gas 10 can contain methane, for example, that can be cracked into molecular hydrogen 12 and solid carbon as the by-product 14. In one exemplary embodiment, the plasmalysis apparatus can be used to convert methane into elemental carbon and a gas with 80% molecular hydrogen, 10% acetylene and 10% residual methane, for example. In other exemplary embodiments, it is also possible to almost completely convert methane into carbon and molecular hydrogen.

The plasmalysis apparatus 100 has a housing 16 that serves as a gas-tight enclosure for a reaction chamber 18.

The plasmalysis apparatus 100 further features a gas supply line 20, exactly one plasma electrode 22, a gas discharge line 24, and a discharge line 26. The discharge line 26 is optional. Instead of the discharge line 26, the plasmalysis apparatus can also be provided with a flap in the floor for discharging the solid by-product 14 (not shown). In other exemplary embodiments, the solid by-product can also be discharged via the gas discharge line, for example.

The plasma electrode 22 is connected to a high-frequency generator 200. In this exemplary embodiment, the high-frequency generator 200 is a separate unit that is connected to the plasmalysis apparatus 100. In other exemplary embodiments, the high-frequency generator can also be part of the plasmalysis apparatus (not shown). The high-frequency generator 200 generates a high-frequency alternating voltage for the plasma electrode 22 and contacts the plasma electrode 22 from outside the housing 16. The high-frequency generator 200 can feature a matching network to perform impedance matching (not shown). The matching network can also be part of the plasmalysis apparatus. In this exemplary embodiment, the high-frequency generator 200 provides power of between 30 W and 50 kW and has an output impedance of 50 ohms. The high-frequency generator provides the high-frequency alternating voltage with a frequency in the range of 1 MHz to 40 MHz, in particular in the range of 10 MHz to 20 MHz, for example with a frequency of 13.56 MHz.

In this exemplary embodiment, the reaction chamber 18 has a non-grounded, non-metallic wall 28. In this exemplary embodiment, the wall is made of quartz glass with a wall thickness of 4 mm. In other exemplary embodiments, a different material, for example a ceramic, such as Macor, and a different wall thickness, for example for quartz glass at least 4 mm, can also be used. Furthermore, a metallic wall with a non-metallic insulation on its inside opposite the plasma electrode, e.g. with a non-metallic insulation coating, can also be provided to electrically insulate the plasma electrode from an outside of the wall. An inner surface 30 of the wall 28 of the reaction chamber 18 spontaneously forms a return electrode during operation of the plasmalysis apparatus 100. Furthermore, the reaction chamber 18 has a gas-tight design so that gas can only be fed into the reaction chamber 18 through the gas supply line 20 and discharged from the reaction chamber 18 via the gas discharge line 24. In this exemplary embodiment, a particle filter 21, which filters solid particles from the hydrogen-containing gas 10, is arranged in addition in the gas supply line 20.

Figure 2:
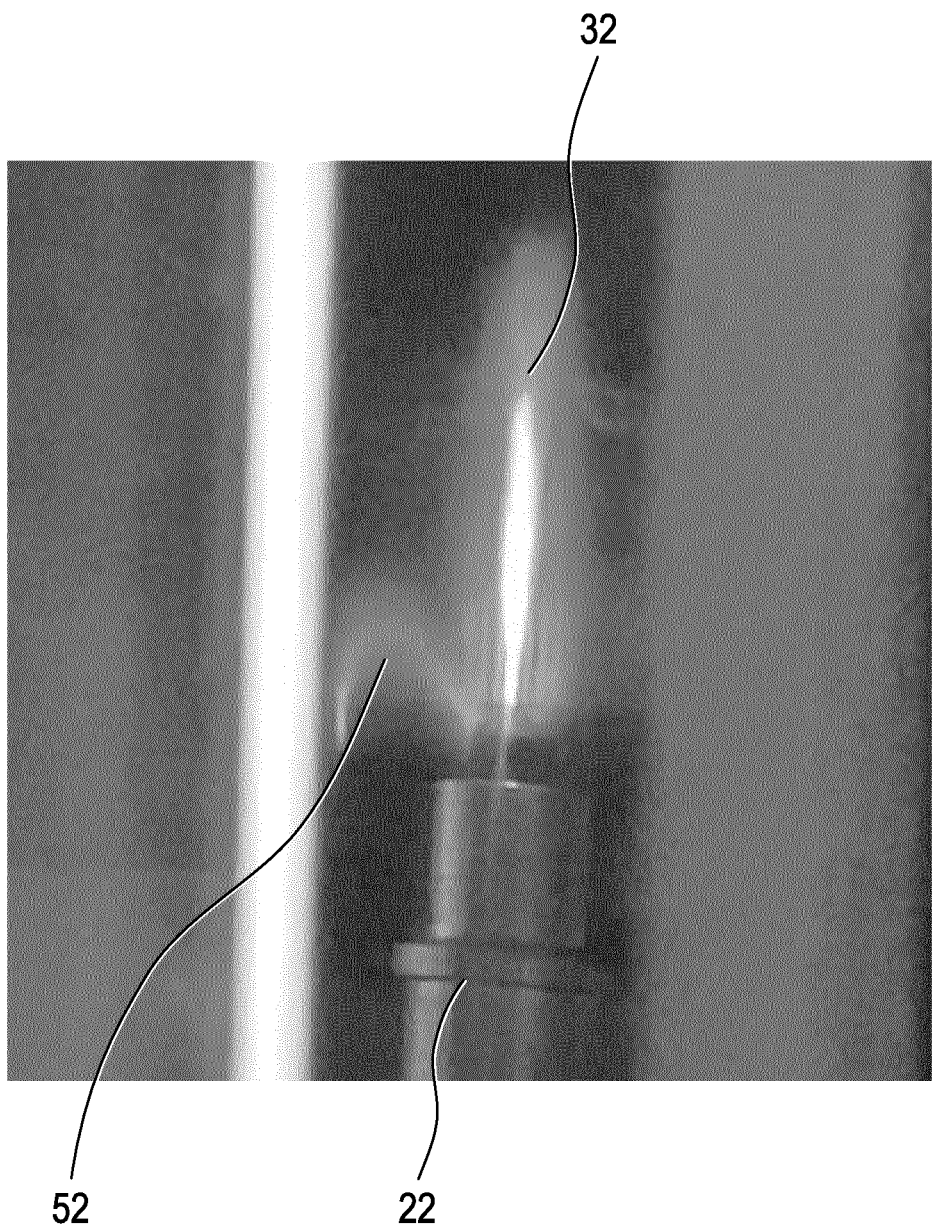
FIG. 2 A photographic presentation of a carbon structure forming at the tip of the plasma electrode of the plasmalysis apparatus during operation of the plasmalysis apparatus of FIG. 1.

The plasma electrode 22 is arranged along a central longitudinal axis of the plasmalysis apparatus 100 so that it is located opposite the gas discharge line 24 in this exemplary embodiment. The wall 28 of the reaction chamber 18 is arranged coaxially to the plasma electrode 22. The plasma electrode 22 is used to generate corona discharges 32 in the reaction chamber 18 by means of the high-frequency alternating voltage (cf. FIG. 2). In this exemplary embodiment, the plasma electrode 22 has an opening 34 that is connected to the gas supply line 20. The gas supply line 20 guides the hydrogen-containing gas 10 through the opening 34 of the plasma electrode 22 into the reaction chamber 18. In this exemplary embodiment, a nozzle 36 is screwed into the opening 34 of the plasma electrode 22, which nozzle thus forms a part of the plasma electrode 22. The plasma electrode 22 is made of stainless steel and contains an aluminum rotating part for screwing in the nozzle 36. The nozzle 36 is an FDM printer nozzle made of brass and stainless steel.

The plasmalysis apparatus 100 is used for gas processing by means of one of the nonthermal plasmas formed by the corona discharge 32. To this end, the hydrogen-containing gas 10 is injected into the reaction chamber 18 through the plasma electrode 22 by means of its nozzle 36. The plasma electrode 22 has the high-frequency alternating voltage that generates a corona discharge 32. The plasmalysis apparatus 100 can crack hydrogen-containing gas 10 that contains mostly methane, for example. Through contact with the non-thermal plasma, the methane is separated—in the absence of oxygen, i.e. in the gastight reaction chamber 18—into elemental pulverized carbon 14 and molecular hydrogen 12. The generated molecular hydrogen 12 is gaseous, and the carbon 14 is solid.

In this exemplary embodiment, the wall 28 of the reaction chamber 18 is also the outside wall of the housing 16. In other exemplary embodiments, the reaction chamber can also be arranged inside the housing, and several walls can be provided between the reaction chamber and the environment.

The gas discharge line 24 is used to discharge the molecular hydrogen 12 from the reaction chamber 18. The molecular hydrogen 12 is typically mixed with other gases, such as unconverted methane, because, during the corona discharge 32, conversion of the hydrogen-containing gas 10 into molecular hydrogen 12 can be incomplete and there can thus be residual components of the hydrogen-containing gas 10, and other gaseous by-products can develop.

The gas discharge line 26 is used to discharge the solid by-product 14 from the reaction chamber 18.

In this exemplary embodiment, the reaction chamber 18 is divided into a main chamber 38 and a secondary chamber 40. The plasma electrode 22 is arranged relative to the main chamber 38 in such a way that the corona discharge 32 ignites in the main chamber 38. The secondary chamber 40 is arranged below the main chamber 38 so that solid by-product 14 can fall down into the secondary chamber 40. In this exemplary embodiment, the secondary chamber 40 comprises a discharge device in the form of an eccentric 42 that discharges the solid by-product 14 from the reaction chamber 18 without any gas entering the reaction chamber 18 via the eccentric 42. In other exemplary embodiments, the discharge device can also comprise a rotary valve, an auger, or other discharge devices. The discharge device can also be arranged in the discharge line, or discharge devices can be arranged in the secondary chamber and the discharge line.

The reaction chamber 18 is designed in such a way that solid by-product can fall from the main chamber 38 into the secondary chamber 40, thereby reducing disruption of the corona discharge 32 by the solid by-product 14. For this purpose, a distance of at least 40 mm between the wall 28 of the reaction chamber 18 and the plasma electrode 22 is provided.

This also reduces the risk of a flashover. Furthermore, this can result in a decrease of the temperature at the inside 30 of the wall 28. The temperature at the inside 30 of the wall 28 can be as high as 800° C., for example.

The plasmalysis apparatus 100 is dimensioned in such a way that hydrogen-containing gas 10 can be fed into the reaction chamber 18 at a flow rate of between 1 l/min and 100 l/min. In this exemplary embodiment, hydrogen-containing gas 10 is fed into the reaction chamber 18 at a flow rate of between 1 l/min and 2 l/min. In other exemplary embodiments, the plasmalysis apparatus can also be operated with a different flow rate.

Figure 3:
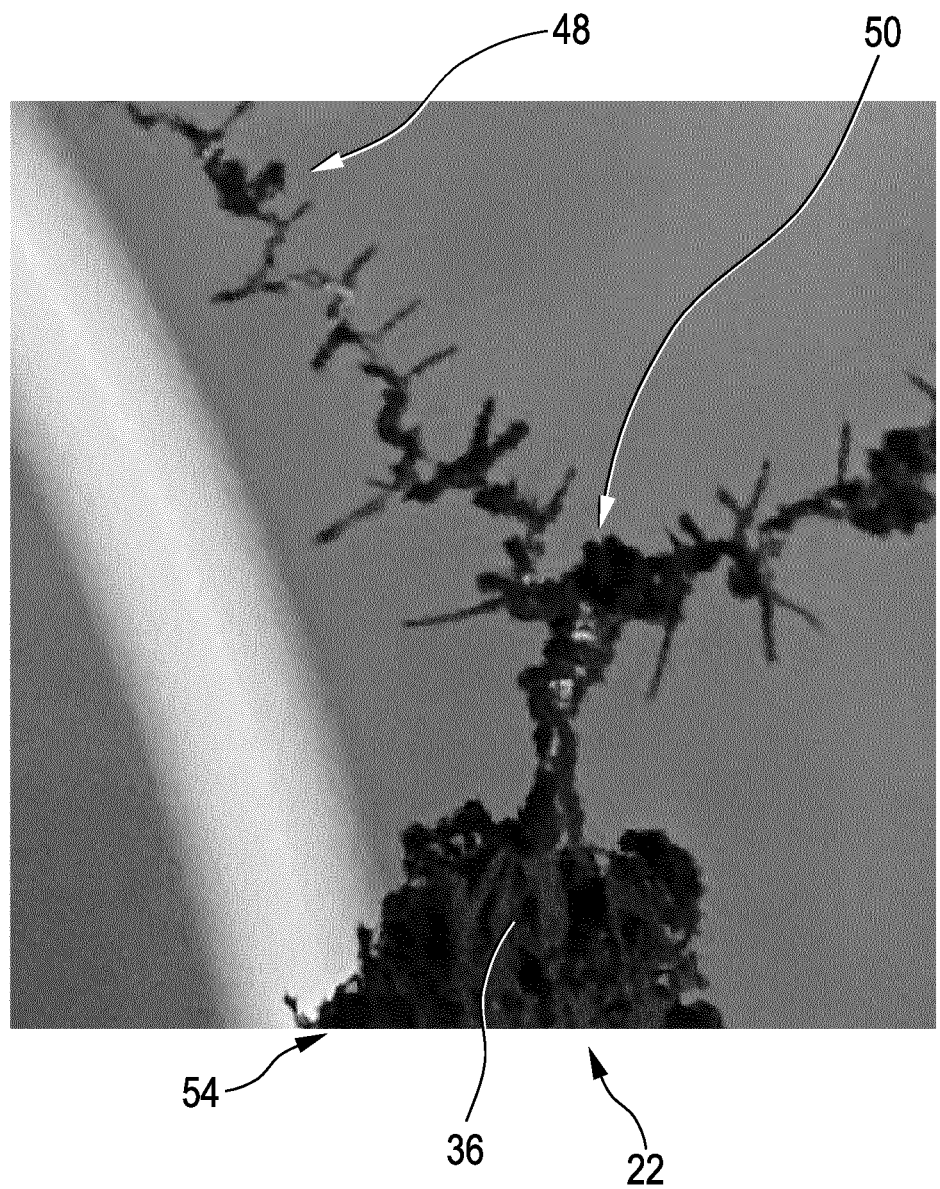
FIG. 3 A photographic presentation of a corona discharge at the plasma electrode in the reaction chamber of the plasmalysis apparatus of FIG. 1.

The reaction chamber 18 also comprises two cleaning elements 44 and 46 for removing the solid by-product 14. For example, the solid by-product 14 can develop carbon structures 48, in the form of solid carbon, that extend from the nozzle 36 of the plasma electrode 22 to the inside 30 of the wall 28 of the reaction chamber 18 (cf. FIG. 3). The carbon structures 48 can build up at some distance from the nozzle 36 at position 50, for example. This is possible, for instance, if the plasma of the corona discharge 32 develops a branch 52 that extends from the plasma electrode 22 in the direction of the inside 30 of the wall 28 of the reaction chamber 18 (cf. FIG. 2). Furthermore, the plasma electrode 22 can become clogged with a carbon layer 54 or a layer of another solid by-product 14.

The cleaning element 44 is used for cleaning the inside 30 of the wall 28. To this end, the cleaning element 44 can have an annular design, wherein an opening in its center has a larger inner diameter than the outer diameter of the plasma electrode 22. The cleaning element 44 is movable along a longitudinal axis 56 on the inside 30 of the wall 28, so that, on the one hand, carbon that has accumulated on the inside 30 of the wall 28 can be removed, and, on the other hand, the carbon structures 48 can also be broken up. In this exemplary embodiment, the cleaning element 44 has an edge 58 on its underside to facilitate the breaking up of carbon structures 48 or another solid by-product 14 that has accumulated on the inside 30 of the wall 28. The carbon or other solid by-product that is removed from the main chamber 38 falls down into the secondary chamber 40; from there, it can be removed from the plasmalysis apparatus 100 by means of the eccentric 42 and the discharge line 26.

The cleaning element 46 is arranged on the plasma electrode 22 and used for removing the carbon layer 54 from the plasma electrode 22. The cleaning element 46 has an edge 60 for removing solid by-product 14 and the carbon layer 54 close to the mouth of the nozzle 36 of the plasma electrode 22. In addition, the cleaning element 46 is fixed to the plasma electrode 22 by means of a sliding ring 62, so that the cleaning element 46 is relatively movable around the longitudinal axis of the plasma electrode 22 and can thus remove the carbon layer 54.

In this exemplary embodiment, it is further provided that the plasma electrode 22 rotates relative to the wall 28 around their common central longitudinal axis. For this purpose, the upper and lower end of the reaction chamber 18 or the upper end of the main chamber 38 and the lower end of the secondary chamber 40 are provided with sliding seal rings 64 that enable a rotation 66 of the plasma electrode 22 relative to the wall 28. A drive for automatic rotation of the plasma electrode 22 relative to the wall 28 is also provided (not shown). In this exemplary embodiment, the plasma electrode 22 is rotated. In other exemplary embodiments, the wall 28 can—instead or additionally—be rotated around the plasma electrode 22.

In this exemplary embodiment, the cleaning element 46 has a fixed connection to the wall 28 so that the plasma electrode 22 also rotates relative to it or is movable relative to the cleaning element 46. Alternatively, the cleaning element 46 can also be rotatable around the plasma electrode, and the plasma electrode 22 can be fixed (not shown).

In this exemplary embodiment, the plasma electrode has an outer diameter of 8 mm, and the opening of the nozzle has a diameter of 0.4 mm. In other exemplary embodiments, the outer diameter of the plasma electrode can also be between 4 mm and 16 mm, and the opening of the nozzle of the plasma electrode can have a diameter of between 0.1 mm and 1 mm, for example. In this exemplary embodiment, the length of the plasma electrode is 150 mm. In other exemplary embodiments, the plasma electrode can have a different length, for example between 50 mm and 300 mm.

The reaction chamber 18 is pressure-resistant for pressures up to 1 bar of positive pressure.

Figure 4:
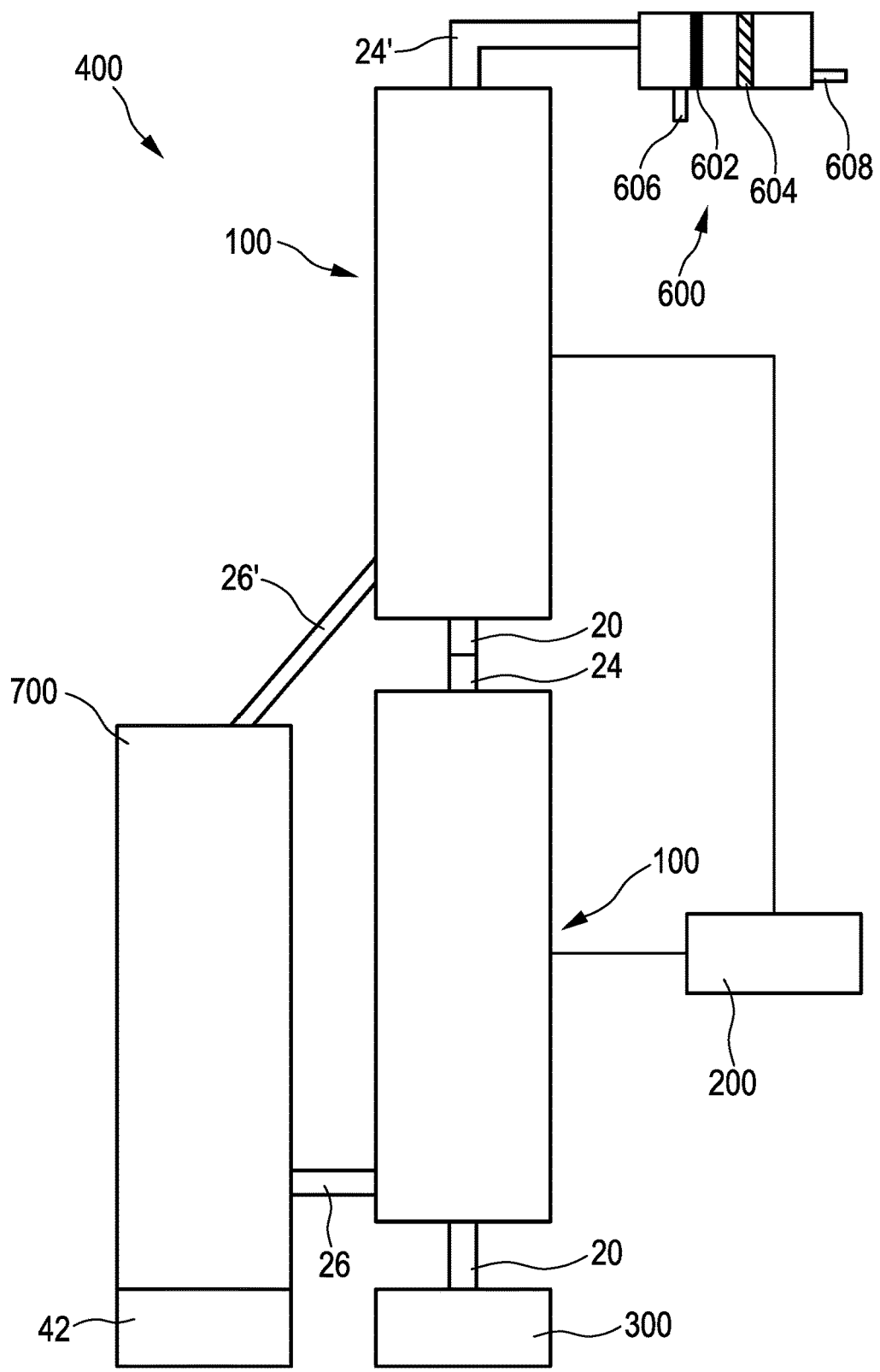
FIG. 4 A schematic depiction of an exemplary embodiment of a plasmalysis apparatus for the corona discharge-induced cracking of hydrogen-containing gas into molecular hydrogen and at least one by-product according to a further aspect of the present disclosure.

FIG. 4 shows an exemplary embodiment of a plasmalysis system 400 for the corona discharge-induced cracking of hydrogen-containing gas into molecular hydrogen and at least one by-product. The plasmalysis system 400 has two plasmalysis apparatuses 100 arranged consecutively in series, as shown in FIG. 1. In other exemplary embodiments, the plasmalysis system can also comprise a different number of plasmalysis apparatuses. The plasmalysis apparatuses can also be arranged parallel to one another. The gas discharge lines of the plasmalysis apparatuses arranged in parallel can lead into a common reservoir or a common gas discharge line, for example.

The plasmalysis system 400 comprises a high-frequency generator 200, a gas tank 300, and two reservoirs 600 and 700. In other exemplary embodiments, several high-frequency generators can be provided, for example a separate high-frequency generator for each plasmalysis apparatus.

A hydrogen-containing gas is made available in the gas tank 300. In this exemplary embodiment, natural gas is used as the hydrogen-containing gas. It is guided through the gas supply line into a first plasmalysis apparatus 100 that cracks the natural gas into molecular hydrogen and other gaseous and solid by-products, in particular carbon, as described for FIG. 1. The solid carbon is discharged via the discharge line 26 into the reservoir 700, where it can be removed by means of an eccentric 42. The molecular hydrogen and the other gaseous by-products are guided via the gas discharge line 24 into the gas supply line 20 of the downstream plasmalysis apparatus 100, where the gaseous by-product is further cracked into additional molecular hydrogen, additional gaseous by-product and solid byproduct, in particular carbon. The solid by-product is discharged via the discharge line 26' into the reservoir 700. In this case, the discharge 26' is chamfered so that solid by-product can slide down from the plasmalysis apparatus 100 into the reservoir 700.

The molecular hydrogen and the other gaseous by-product are guided into the reservoir 600 via the gas discharge line 24'.

The reservoir 600 has a membrane 602 and a selective adsorber 604. Furthermore, two additional gas discharge lines 606 and 608 lead out of the reservoir; they are designed to discharge separated gas from the reservoir 600. The reservoir can also be part of the plasmalysis apparatus (not shown). Membranes and selective adsorbers can also be arranged in a gas discharge line of a plasmalysis apparatus (not shown).

In the reservoir 600, gaseous by-product, for example unconverted methane, is separated from the molecular hydrogen in the gas mix consisting of molecular hydrogen and gaseous by-product. In this exemplary embodiment, it is done in a two-step process with the membrane 602 and the selective adsorber 604. Methane cannot pass through the membrane 602 and is discharged via the gas discharge line 606. Any additional gaseous by-product is adsorbed by the selective adsorber 604, so that essentially only molecular hydrogen is discharged via the gas discharge line 608. In this exemplary embodiment, the membrane is a polymer membrane. ZSM-5 is used as the adsorber, for example. In other exemplary embodiments, several membranes and/or several adsorbers may be used. In other exemplary embodiments, other membranes and/or adsorbers may be used.

Figure 5:
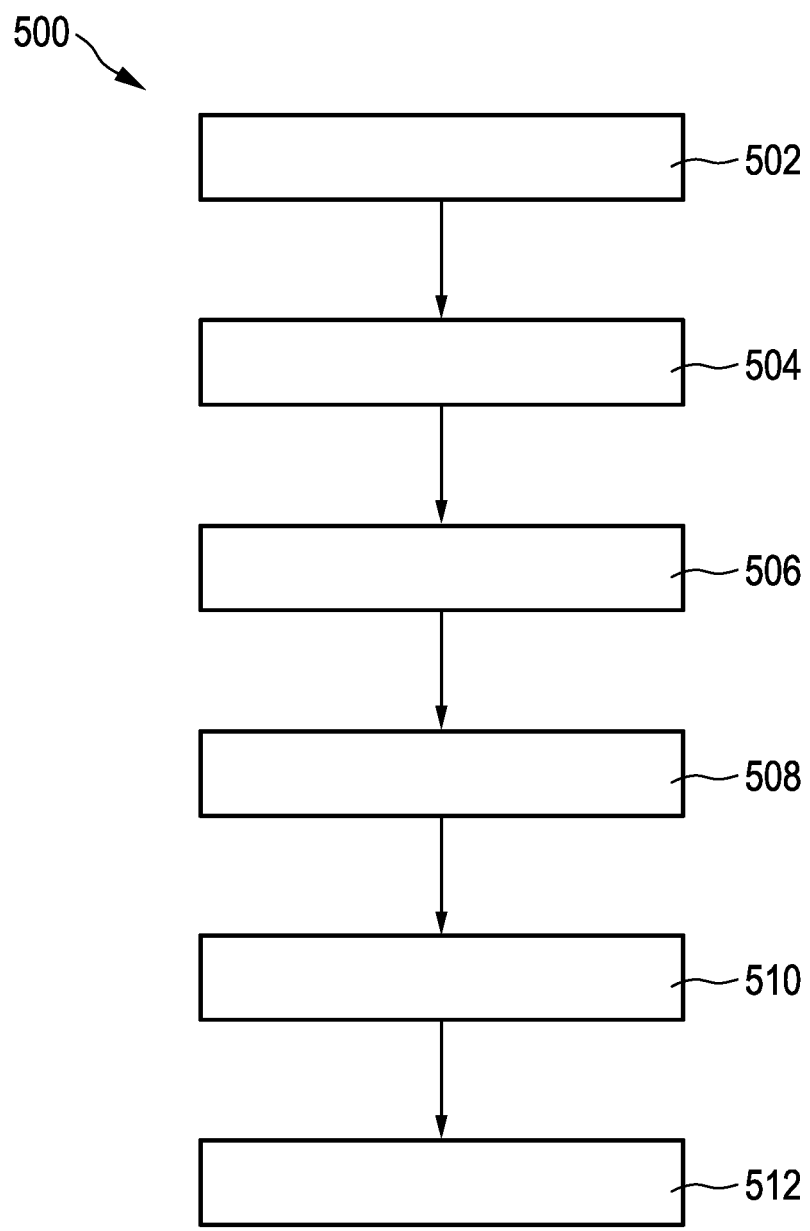
FIG. 5 A schematic depiction of a flow chart of an exemplary embodiment of a method for the corona discharge-induced cracking of hydrogen-containing gas into molecular hydrogen and at least one by-product according to a further aspect of the present disclosure.

FIG. 5 shows a schematic depiction of a flow chart of an exemplary embodiment of a method 500 for the corona discharge-induced cracking of hydrogen-containing gas into molecular hydrogen and at least one by-product according to a further aspect of the present disclosure.

In step 502, hydrogen-containing gas is fed into a gas-tight reaction chamber with a non-grounded non-metallic wall. In other exemplary embodiments, a different type of wall may be provided that electrically insulates the plasma electrode from the outside of the wall of the reaction chamber. In this exemplary embodiment, the hydrogen-containing gas is fed into the reaction chamber through an opening of a plasma electrode into the reaction chamber. The plasma electrode comprises in particular a nozzle that is used to inject the hydrogen-containing gas into the reaction chamber.

In step 504, a corona discharge is generated in the reaction chamber by means of the plasma electrode. For this purpose, a high-frequency generator supplies a high-frequency alternating voltage to the plasma electrode. Exactly one plasma electrode is provided, and an inside of the wall of the reaction chamber spontaneously forms a return electrode during operation without any electrical flows being dissipated, i.e. the wall is not grounded or without grounding.

In step 506, the molecular hydrogen and the at least one by-product is discharged from the reaction chamber. In this exemplary embodiment, natural gas, which contains primarily methane and also hydrogen sulfide, among others, is used as the hydrogen-containing gas.

In other exemplary embodiments, a different hydrogen-containing gas can also be used, for example a hydrogen-containing substance that is liquid at room temperature and has been converted into the gaseous aggregate state. Methane is cracked into molecular hydrogen and carbon powder as the solid by-product. The solid by-product can also contain elemental carbon, carbon nanotubes, fullerenes, carbon nanocones, or other carbon structures, for example. The molecular hydrogen is gaseous, and it is discharged via a gas discharge line. The carbon is discharged via a discharge line. In this exemplary embodiment, the carbon falls down from the position of the corona discharge and is then removed via the discharge line. Alternatively, or additionally, the carbon particles can also be removed via the gas discharge line and filtered from the gas flow, which is discharged from the reaction chamber, by means of a particle filter.

In step 508, the reaction chamber is cleaned to remove solid by-product from the reaction chamber. Step 508 is optional. During operation, the carbon can develop carbon structures that can extend from the plasma electrode to the inside of the wall of the reaction chamber. In addition, carbon can accumulate on the inside of the wall of the reaction chamber. For this purpose, provision may be made to remove the solid by-product mechanically by means of one or several cleaning elements. Alternatively, the flow rate of the introduced hydrogen-containing gas can be increased so as to break up carbon structures or prevent them from forming, thereby cleaning the reaction chamber. In addition, surge gas pulses can be emitted from the opening of the plasma electrode to break up carbon structures, in particular tree-like structures or graphite spikes that form on the plasma electrode. Furthermore, it is also possible to adjust the composition of the hydrogen-containing gas for cleaning of the reaction chamber, or a different gas, such as an inert gas, can be used for cleaning.

The gas discharged from the reaction chamber can contain additional gaseous by-products aside from the molecular hydrogen. For example, it can still contain residual gas of the hydrogen-containing gas initially fed into the reaction chamber, for example unconverted methane. The gas discharged from the reaction chamber can also contain solid by-product, for example carbon.

In step 510, the gas discharged from the reaction chamber is collected in a reservoir. Alternatively, the gas can also be collected in the gas discharge line. Step 510 is optional. Alternatively, the discharged gas can also flow through the reservoir and/or the gas discharge line at an essentially unchanged flow rate.

In step 512, the discharged gas is separated into different gases; in particular, the molecular hydrogen is separated from other gaseous by-products. Step 512 is optional. In this exemplary embodiment, a multi-stage membrane process and a selective adsorption method are used for separating the molecular hydrogen from the other gaseous by-products. Other exemplary embodiments may provide for only one membrane process and/or only one selective adsorption method. Step 512 is performed in the reservoir in this exemplary embodiment. To this end, several membranes arranged in series and an adsorber are installed in the reservoir. In other exemplary embodiments, the different gases can also be separated in the gas discharge line. If there is still solid by-product, for example carbon, in the discharged gas, it can be filtered out from the gas, for example by means of a particle filter.

Figure 6:
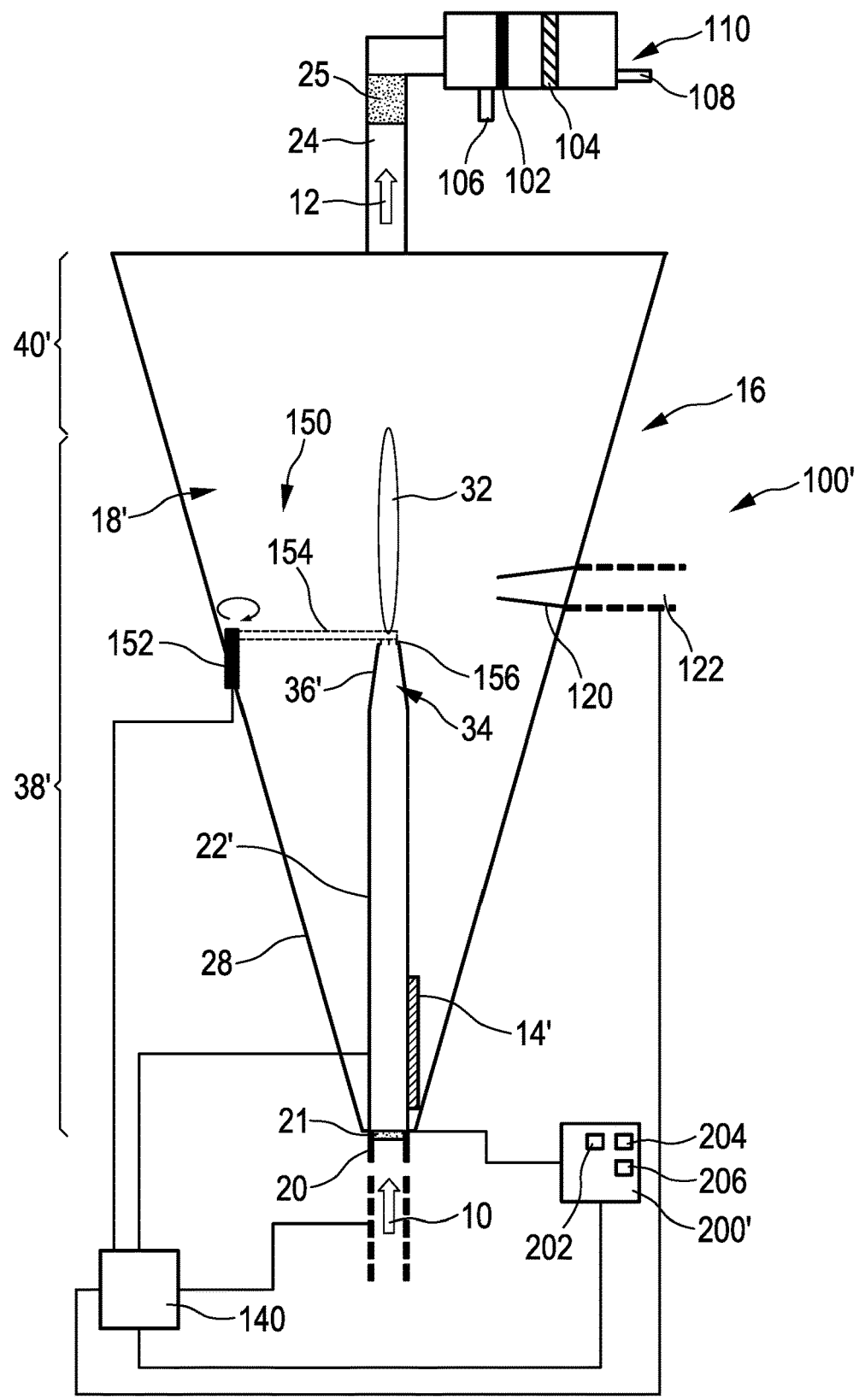
FIG. 6 A schematic depiction of a further exemplary embodiment of a plasmalysis apparatus for the corona discharge-induced cracking of hydrogen-containing gas into molecular hydrogen and at least one by-product according to the first aspect of the present disclosure.

FIG. 6 shows a schematic depiction of a further exemplary embodiment of a plasmalysis apparatus 100' for the corona discharge-induced cracking of hydrogen-containing gas 10 into molecular hydrogen 12 and at least one by-product. In this exemplary embodiment, methane is primarily used as the hydrogen-containing gas 10. The resulting by-products are primarily graphite spikes 14' and carbon particles.

The design of the plasmalysis apparatus 100' is similar to that of the plasmalysis apparatus 100 shown in FIG. 1, and it has a similar operating principle. The plasmalysis apparatus 100' has a housing 16 that serves as a gas-tight enclosure for a funnel-shaped reaction chamber 18'. The plasmalysis apparatus 100' further features a gas supply line 20, exactly one plasma electrode 22', and a gas discharge line 24. A particle filter 21, which filters particles from the hydrogen-containing gas 10, is arranged in the gas supply line 20. A particle filter in the form of a carbon particle filter hose 25 is arranged in the gas discharge line 24 to filter the carbon particles from the gas that is discharged from the reaction chamber 18'.

The main difference is the fact that, during operation of the plasmalysis apparatus 100' and in contrast to the plasmalysis apparatus 100 shown in FIG. 1, brittle graphite spikes 14' form on the tip of the plasma electrode 22' instead of solid by-product in the form of tree-like structures (cf. FIG. 3), and smaller amounts of carbon particles accumulate in the reaction chamber 18'. The graphite spikes 14' develop because of a higher gas flow rate and a resulting stronger gas flow from an opening 34 of the plasma electrode 22'. The stronger the gas flow, the fewer branches of a tree-like structure can develop; hence, with a strong enough gas flow, no branches develop and only a stem or spike, namely a graphite spike 14', will form. In this exemplary embodiment, no branches will form at a gas flow rate of more than 2 liters per minute (>2 l/min); the gas flow is funnel-shaped in this case. Furthermore, the stronger gas flow will also facilitate the discharge of carbon particles from the reaction chamber 18' into the gas discharge line 24. The graphite spikes 14' will break off or are broken off after a certain time and fall onto the floor of the reaction chamber 18'.

In contrast to the plasmalysis apparatus 100 shown in FIG. 1, part of the solid by-product, namely the carbon particles, is also discharged via the gas discharge line 24. These can be discharged during a corona discharge 32 together with the gas flow generated from the opening 34 of the plasma electrode 22' into the gas discharge line 24. The carbon particles are filtered in the carbon particle filter hose 25 and thereby separated from the gas discharged from the reaction chamber 18'.

Furthermore, in a cleaning mode, the graphite spike 14' can be knocked over and carbon particles that have accumulated in the reaction chamber 18' can be blown out of the reaction chamber 18'. To this end, surge gas pulses are emitted from the opening 34 of the plasma electrode 22'. The plasma electrode 22' has a funnel-shaped nozzle 36' for this purpose that is connected to the gas supply line 20 via the opening 34 and the particle filter 21. This facilitates the easy removal of solid by-product that forms in the reaction chamber, in particular carbon particles, from the reaction chamber 18'.

A control unit 140 is provided for controlling the generation of the surge gas pulses in this exemplary embodiment. The control unit 140 measures a power input into the plasmalysis apparatus 100', and interrupts the supply of high-frequency alternating voltage to the plasma electrode 22', and triggers a surge gas pulse via the gas supply line 20 if the power input is below a threshold value. The threshold value is selected in such a way that it ensures that the opening 34 of the plasma electrode 22' is not clogged too much with solid by-product. For this purpose, the control unit 140 can be connected to a gas feed of the gas supply line 20, so that the gas feed can be temporarily increased. For example, a valve that can be controlled by the control unit can be arranged in the gas supply line to generate the surge gas pulse. In other exemplary embodiments, surge gas pulses can also be generated on the basis of other events or time-controlled, for example at regular time intervals, to remove solid by-product from the reaction chamber 18' and, in particular, to remove solid by-product from the opening 34 of the plasma electrode 22'.

While the carbon particles can be blown out into the gas discharge line 24 with the gas flow, the graphite spike 14' can fall from the plasma electrode 22' onto the floor of the reaction chamber 18'. The gas used in the surge gas pulses can be the hydrogen-containing gas 10 or a different gas, for example an inert gas.

The carbon particles are moved with the gas flow into the gas discharge line 24, where they are filtered by means of the carbon particle filter hose 25. The remaining gas is guided into a reservoir 110. A membrane 102 and a selective adsorber 104 are arranged in the reservoir 110. Furthermore, a discharge line 106 and an additional gas discharge line 108 lead out of the reservoir 110; they are designed to discharge separated molecular hydrogen and by-products from the reservoir 110. Alternatively, membranes and selective adsorbers can also be arranged in the gas discharge line of the plasmalysis apparatus (not shown). It is also possible to use other methods for separating the molecular hydrogen from the particles of the solid by-product. Only one particle filter or only one membrane can be provided, for example.

In the reservoir 110, solid by-product that was not filtered out by the carbon particle filter hose 25, and gaseous by-product, for example unconverted methane, are separated from the molecular hydrogen in the gas mix consisting of molecular hydrogen and by-product.

In this exemplary embodiment, this happens in a two-step process with the membrane 102 and the selective adsorber 104. The solid by-product and methane cannot pass through the membrane 102 and are discharged via the discharge line 106. If the membrane 102 absorbs solid by-product, the membrane 102 can be replaced or cleaned. In this exemplary embodiment, the membrane 102 is self-cleaning. The membrane 102 is connected to a gas collection system for this purpose (not shown). The gas collection system collects gas, thereby building up pressure that is released in the form of a gas pulse when it exceeds a pressure threshold. The gas pulse cleans the membrane 102. Any additional gaseous byproduct is adsorbed by the selective adsorber 104, so that essentially only molecular hydrogen is discharged via the gas discharge line 108. Other exemplary embodiments can also be designed to generate a synthetic gas. To this end, the methane from the gas discharge line 106 can be combined with the molecular hydrogen 12 from the gas discharge line 108 at a specified gas mix ratio, for example. Alternatively, the membrane and/or the adsorber can also be selected in such a way that a gas mix of molecular hydrogen and another gaseous by-product or the methane is generated.

In this exemplary embodiment, the membrane is a polymer membrane. ZSM-5 is used as the adsorber, for example. In other exemplary embodiments, several membranes and/or several adsorbers may be used. In other exemplary embodiments, different membranes and/or adsorbers may be used.

Furthermore, the reaction chamber 18' has a different shape than the reaction chamber 18 of the plasmalysis apparatus shown in FIG. 1, namely a funnel shape. A cross-section of the reaction chamber 18' is thus enlarged in the direction from the gas supply line 20 to the gas discharge line 24. This can prevent or at least reduce any attachment of the carbon particles that are discharged from the reaction chamber 18' with the gas flow.

In this exemplary embodiment, the plasma electrode 22' is screwed into the housing 16 from below and can be removed, if necessary, for example for removing graphite spikes 14'. When the plasmalysis apparatus 100' is in operation, the graphite spikes 14' can form on the tip of the plasma electrode 22' near the corona discharge 32. The graphite spike 14' is conductive and can temporarily form part of the plasma electrode 22'. The graphite spike 14' is brittle and typically breaks off after a certain time in operation, and then falls towards the floor of the funnel-shaped reaction chamber 18'.

The plasma electrode 22' is connected to a high-frequency generator 200'. In this exemplary embodiment, the high-frequency generator 200' has a matching network consisting of two coils 202, 204 and a capacitor 206, so that impedance matching can be carried out.

In this exemplary embodiment, the high-frequency generator 200' provides power of between 30 W and 5000 W and has an output impedance of 50 ohms. The high-frequency generator 200' provides the high-frequency alternating voltage with a frequency in the range of 1 MHz to 40 MHz, in particular in the range of 10 MHz to 20 MHz, for example with a frequency of 13.56 MHz.

In this exemplary embodiment, the reaction chamber 18 has a non-grounded, non-metallic wall 28. In other exemplary embodiments, the reaction chamber may be enclosed by a different type of wall that is designed to electrically insulates the plasma electrode from an outside of the wall. In this exemplary embodiment, the wall 28 is made of quartz glass with a wall strength or thickness of 4 mm. In other exemplary embodiments, the wall may also consist of a different material, for example a ceramic. The wall thickness may also be different.

The plasmalysis apparatus 100' further comprises a cross nozzle 120 arranged in the wall 28 of the reaction chamber 18' for cleaning of the plasma electrode 22', for blowing over the graphite spike 14', and for reducing turbulences. The cross nozzle 120 is arranged a small distance above the tip of the plasma electrode 22'. In other exemplary embodiments, the cross nozzle can also be arranged at a different position, for example protruding from the floor and in a different orientation towards the plasma electrode, in particular for cleaning the plasma electrode. The cross nozzle 120 is connected to a cross-gas supply line 122 that can introduce an inert gas or additional hydrogen-containing gas into the reaction chamber 18', for example, in order to clean the plasma electrode 22' with a surge gas pulse and to possibly knock over the graphite spike 14' so that it falls onto the floor of the reaction chamber 18'. The cross nozzle 120 and cross-gas supply line 122 are optional. The control unit 140 can control the gas supply of the cross nozzle 120. Alternatively, or additionally, the gas supply of the cross nozzle can also be time-controlled, and a gas pulse can be introduced into the reaction chamber every 5 minutes, for example.

The plasmalysis apparatus 100' further comprises a cleaning element 150 with a pivoting axis 152 and a rod 154. One end of the rod 154 is connected to the pivoting axis 152, and the other end has a brush 156 that is directed towards the floor. The length of the rod 154 can be 40 mm or more, for example. The pivoting axis 152 is arranged close to the wall 28 of the reaction chamber 18'; it is powered by an electric drive for pivoting the axis 152 and thus the rod 154. The rod 154 can be pivoted in such a way that the brush 156 moves across the tip of the plasma electrode 22' to clean it and, if necessary, help to break off graphite spikes 14'. In other words, the cleaning element 150 works similar to a windshield wiper that wipes across the tip of the plasma electrode 22'. The corona discharge 32 is briefly interrupted when the brush 154 moves across the tip of the plasma electrode 22'. The control unit 140 can control the cleaning element 150.

In this exemplary embodiment, the reaction chamber 18' is divided into a main chamber 38' and a secondary chamber 40'. In contrast to the plasmalysis apparatus 100 shown in FIG. 1, the secondary chamber 40' is arranged above the main chamber 38' in this case. The corona discharge 32 takes place in the main chamber 38', and the secondary chamber 40' is used to discharge the molecular hydrogen 12 as well as carbon particles in the gas flow, namely into the gas discharge line 24.

In other exemplary embodiments, the gas discharge line may have no particle filter, a different or an additional particle filter for absorbing the carbon particles. The particle filter can be a pressure-controlled particle filter, for example. Alternatively, or additionally, a controllable flap may also be provided. The flap can be provided at a fork in the gas discharge line to separate—in the cleaning mode when a surge gas pulse is emitted—gas from the reaction chamber that is contaminated with a particularly high load of carbon particles from the molecular hydrogen generated during normal operation.

Additional features that were mentioned with reference to the plasmalysis apparatus 100 shown in FIG. 1 are not explicitly described again for the plasmalysis apparatus 100', but they can optionally be available, for example additional cleaning elements.

Figure 7:
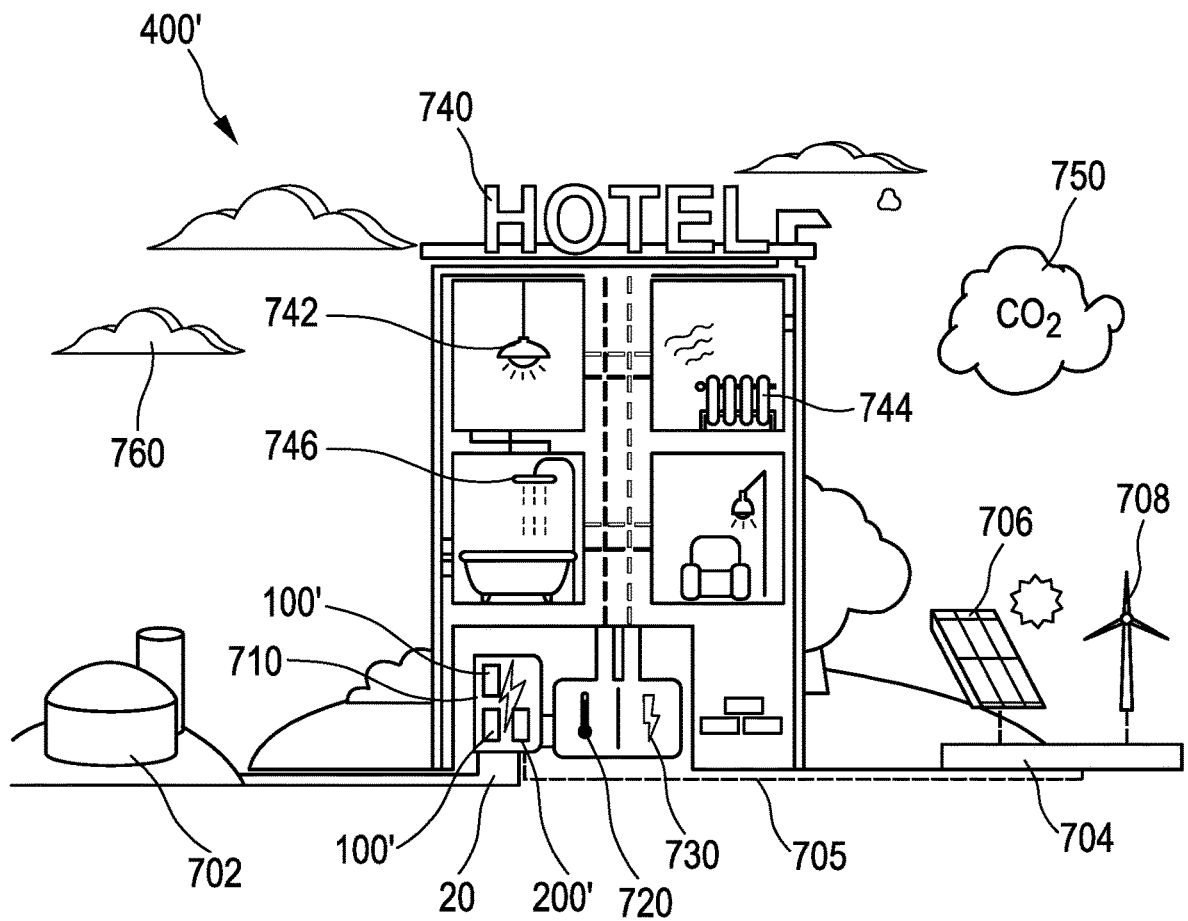
FIG. 7 A schematic depiction of a further exemplary embodiment of a plasmalysis system according to a further aspect of the present disclosure.

FIG. 7 shows another exemplary embodiment of a plasmalysis system 400' for the cracking of hydrogen-containing gas into molecular hydrogen and at least one by-product. In this exemplary embodiment, the plasmalysis system 400' is connected to a heat supply device in the form of the heater 720 and to the energy supply in the form of a fuel cell 730 of a building, in particular a hotel 740. Alternatively, these can also be part of the plasmalysis system 400'. Instead of a hotel, a different building or a different stationary or mobile structure can be connected to the plasmalysis system. Instead of a separate heat supply device and energy supply, these elements can also be combined in a CHP, for example.

The plasmalysis system 400' comprises a storage unit with hydrogen-containing gas in the form of a biogas reactor 702, an energy system 704, and a plasmalysis unit 710.

In addition, the biogas reactor 702 is connected to a wastewater treatment plant (not shown) and generates a hydrogen-containing gas in the form of biogas from wastewater and waste. This biogas contains primarily methane.

The energy system 704 comprises a solar power system 706 and a wind energy system 708. The energy system 704 is used for providing energy for the corona discharge-induced cracking of hydrogen-containing gas into molecular hydrogen and the at least one by-product. In other exemplary embodiments, the energy system can also comprise other energy-generating systems, for example a hydroelectric power system additionally or alternatively.

The plasmalysis unit 710 comprises two plasmalysis apparatuses 100' and a high-frequency generator 200'.

The plasmalysis unit 710 is connected to the biogas reactor 702 via the gas supply line 20 and to the energy system 704 via the power line 705.

This way, using green electricity from the energy system 704 and biogas from the biogas reactor 702, it is possible to generate emission-free heat and molecular hydrogen that can be used in the heater 720 and the fuel cell 730 of the hotel 740. The hotel 740 can thus power the lighting 742, radiators 744 and hot water preparation for the shower 746 without producing environmentally harmful carbon dioxide 750. Instead, it only produces solid byproduct, for example in the form of elemental carbon, as well as clean water that is returned to the water cycle in the form of clouds 760, for example.

Alternatively, the generated molecular hydrogen can also be stored in a hydrogen storage unit for later use, for example. For instance, the hotel can make a hydrogen filling station available where vehicles can be filled with hydrogen. It is also possible to supply the molecular hydrogen to other energy systems that can be operated using molecular hydrogen.

In one exemplary embodiment, the hotel can be part of a cruise ship, for example. The cruise ship can have its own wastewater treatment system and its own energy system, both of which can provide hydrogen-containing gas and energy for operating the plasmalysis apparatuses. In further exemplary embodiments, plasmalysis apparatuses can also be used in other vehicles, like passenger cars, trucks, railroad drive cars, or airplanes, for example LPG aircraft or aircraft powered by synthetic gas. In airplanes, for example, kerosene, JP-8 or another conventional fuel can be converted into carbon and LPG (liquefied petroleum gas) or synthetic gas, which can then be used for powering the airplane. This can reduce carbon dioxide emissions in transport without having to replace the existing infrastructure to a large extent.

Figure 8:
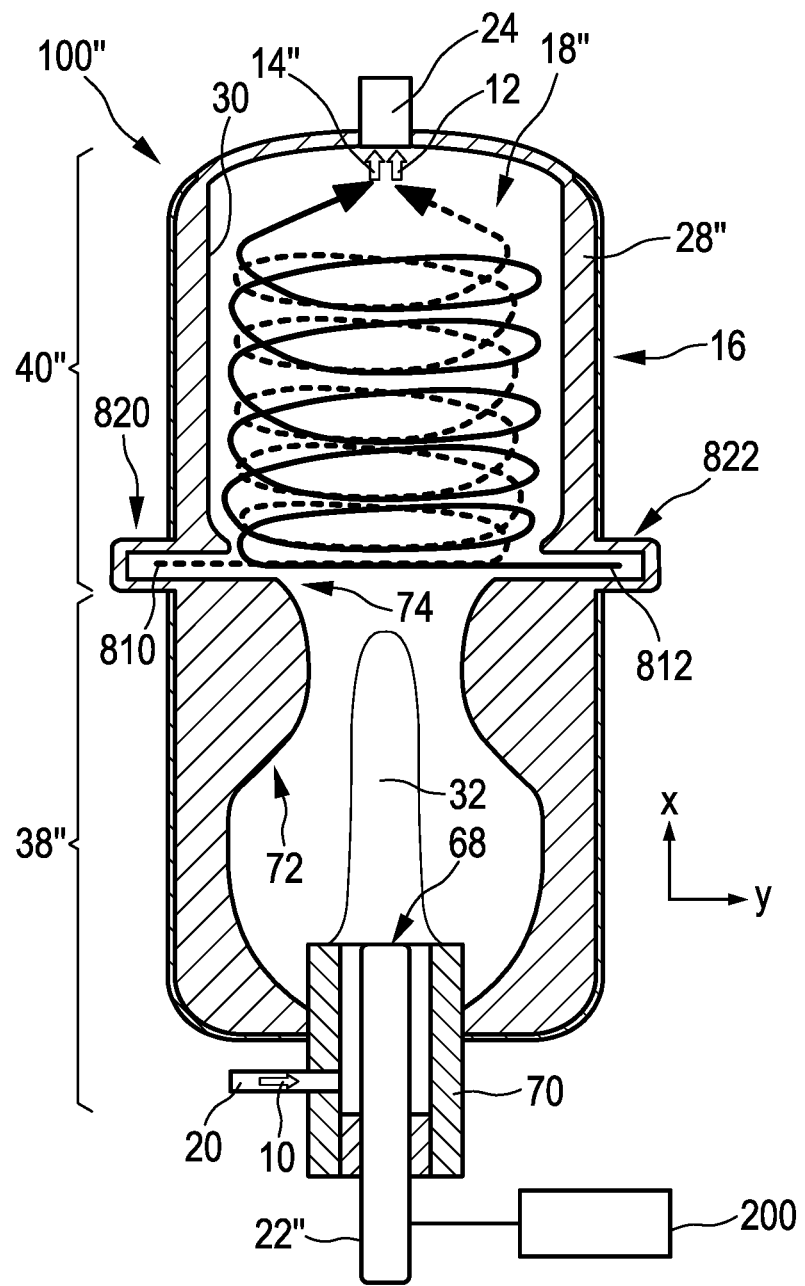
FIG. 8 A schematic depiction of a further exemplary embodiment of a plasmalysis apparatus for the corona discharge-induced cracking of hydrogen-containing gas into molecular hydrogen and at least one by-product according to the first aspect of the present disclosure.

FIG. 8 shows a schematic depiction of a further exemplary embodiment of a plasmalysis apparatus 100" for the corona discharge-induced cracking of hydrogen-containing gas 10 into molecular hydrogen 12 and at least one by-product 14" or for producing molecular hydrogen 12 and at least one by-product 14"'. The operating principle of the plasmalysis apparatus 100" is similar to that of the other plasmalysis apparatuses 100 and 100'.

The plasmalysis apparatus 100" can be used to continuously produce the molecular hydrogen 12 and the at least one by-product 14, for example. To this end, hydrogen-containing gas 10 is continuously supplied to the plasmalysis apparatus 100". The hydrogen-containing gas 10 is cracked in a plasma generated by a corona discharge 32. The atoms and molecules generated by the cracking of the hydrogen-containing gas 10 combine into new molecules and form molecular hydrogen 12 and the at least one by-product 14". The molecular hydrogen 12 and/or the at least one by-product 14" can in turn be used for producing downstream products. For example, a synthesis step can be carried out in order to produce the downstream products. In this exemplary embodiment, one of the by-products 14" is present in the form of small particles; it is discharged from the reaction chamber together with the gas flow of the gas mix generated by the corona discharge 32. A further by-product 14" is a gaseous by-product.

The plasmalysis apparatus 100" comprises a housing 16, a gas-tight reaction chamber 18", a gas supply line 20 for the hydrogen-containing gas 10, two further gas supply lines 820 and 822 for additional gases 810 and 812, exactly one plasma electrode 22" for generating corona discharges 32 in the reaction chamber 18" by means of a high-frequency alternating voltage, as well as a gas discharge line 24. The plasma electrode 22" is connected to a high-frequency generator 200 that supplies the high-frequency alternating voltage to the plasma electrode 22". The gas discharge line 24 discharges the molecular hydrogen 12 and the by-products 14" from the reaction chamber 18".

In this exemplary embodiment, the plasma electrode 22" is made of graphite. In addition, the plasma electrode 22" has a flat end 68 for generating the corona discharges 32 in the reaction chamber 18". During operation of the plasmalysis apparatus 100", carbon atoms detach from the plasma electrode 22" and are discharged from the reaction chamber 18" together with the gas flow. For example, 1 to 2 g of carbon can detach from the plasma electrode 22" per kWh. This means that the plasma electrode 22" gets shorter over time.

It is possible to slide in the plasma electrode 22", for example continuously, so that the position of the flat end 68 of the plasma electrode 22" within the reaction chamber 18" does not change over time. Alternatively, the plasma electrode 22" can also be replaced after a certain operating time or if a certain amount of carbon has been detached. The plasma electrode 22" can also be moved in order to change the position of the corona discharge 32 and thus of the plasma. This way it is possible to move a hottest point of the plasma that is located at its end to a specific axial position along the reaction chamber 18".

The housing 16 has a wall 28" that provides a gas-tight enclosure for the reaction chamber 18". In this exemplary embodiment, the housing 16 is made of graphite. An insulator 70 forms part of the wall 28" of the reaction chamber 18". The insulator 70 is arranged around the plasma electrode 22" at a transition from the reaction chamber 18" to an outer environment of the reaction chamber 18". The insulator 70" surrounds the plasma electrode 22" in such a way that the reaction chamber 22" is gas-tight. A seal can be provided between the insulator and the plasma electrode for this purpose. The insulator and the plasma electrode itself can provide the seal if they are respectively flush fitting. Alternatively, or additionally, the plasma electrode can also have different diameters along an axial axis so that the diameter of the plasma electrode within the reaction chamber is smaller than the diameter outside of the reaction chamber. The insulator 70 electrically insulates the plasma electrode 22" from an outside of the wall 28". In this exemplary embodiment, the insulator 70 electrically insulates the plasma electrode 22" also from the remaining part of the wall 28". The insulator 70 is made of aluminum oxide in this exemplary embodiment. Alternatively, the insulator can also be made of one or several other ceramics, for example high-temperature ceramics.

The gas supply line 20 is arranged in such a way that the hydrogen-containing gas 10 flows along a surface of the plasma electrode 22" in the direction of the corona discharge 32. The gas supply line 20 runs through an opening in the wall 28" of the reaction chamber 18" into the insulator 70 so that the hydrogen-containing gas 10 flows parallel to the plasma electrode along its outer surface in the direction of the corona discharge 32. This makes it possible to move the plasma generated by the corona discharge 32 in the direction of the gas discharge line 24.

The reaction chamber 18" is divided into a main chamber 38" and a secondary chamber 40". The corona discharge ignites in the main chamber 38". The secondary chamber 40" is arranged downstream from the main chamber 38" in the flow direction so that particles generated by the corona discharge 32 can flow into the secondary chamber 40".

In this exemplary embodiment, the additional gas supply lines 820 and 822 are arranged in such a way that they feed the additional gases 810 and 812 into the secondary chamber 40" so that a turbulent flow or a cyclone-like flow is generated within the secondary chamber 40". This flow can help discharge the gas mix generated by the corona discharge 32 as well as solid particles from the reaction chamber 18" into the gas discharge line 24. Alternatively, or additionally, the secondary chamber 40" can be used for the synthesis steps. Which synthesis steps can be performed will depend on which additional gases 810 and 812, aside from the hydrogen-containing gas 10, are fed into the reaction chamber 18" via the additional gas supply lines 820 and 822.

In addition, the reaction chamber 18" has a tapered section 72 between the gas supply line 20 and the gas discharge line 24, and an enlarged section 74 of the reaction chamber 18" subsequently connected in the flow direction, which together form a de Laval nozzle. The tapered section 72 reduces a cross section of the reaction chamber 18"; this cross-section of the reaction chamber 18" is then enlarged again by the enlarged section 74. The de Laval nozzle is used to generate a nozzle flow that increases the flow speed within the reaction chamber 18", thereby speeding up the gas mix generated by the corona discharge 32 in the direction of the gas discharge line 24. Flow speeds of between 12 and 14 m/s can be achieved, for example. This can make it possible to ensure that no solid particles accumulate on, and contaminate, the inside 30 of the wall 28" in the main chamber 38".

In this exemplary embodiment, the additional gas supply lines 820 and 822 are arranged near the end of the de Laval nozzle. In other exemplary embodiments, the gas supply lines can also be arranged at different positions along the reaction chamber 22". For example, the gas supply lines 820 and 822 can also be arranged in such a way that they can clean the plasma electrode and feed additional gases directly into the corona discharge.

Furthermore, in this exemplary embodiment, the plasma electrode 22" is arranged relative to the tapered section 72 and the enlarged section 74 in such a way that the end of the plasma generated by the corona discharge 32 is located on or near the smallest cross section of the reaction chamber 18". The end of the plasma is the hottest point, which means that an additional energy input for the cracking of molecules is generated here. The plasma can also end at the level of the additional gas supply lines 820 and 822 (not shown). The position of the plasma, and thus also the end of the plasma, can also be changed or change during operation if the position of the flat end 68 of the plasma electrode 22" changes, for example because carbon atoms detach or because the plasma electrode 22" is moved.

The hydrogen-containing gas 10 is hydrogen in this exemplary embodiment. The additional gas 810 fed into the reaction chamber 18" via the gas supply line 820 is also hydrogen in this case, and the additional gas 812 fed into the reaction chamber 18" via the additional gas supply line 822 is methane in this case. Different flow rates can be used to feed the gases 10, 810, and 812 into the reaction chamber 18". This can make it possible to influence the composition of the gas mix generated during the corona discharge 32. In this case, a hydrogen plasma that can reach higher temperatures is generated. In other exemplary embodiments, the methane can be fed into the plasma via one of the additional gas supply lines and thus cracked directly. This can make it possible to influence the composition of the gas mix produced. Alternatively, it is also possible to feed a different hydrogen-containing gas 10 into the reaction chamber 18" via the gas supply line 20. The hydrogen and methane in the additional gases 810 and 812 can also be replaced with other gases. Additional components for analysis, such as analysis devices, can be provided upstream from, in, or downstream from the gas supply lines and the gas discharge line (not shown). They can analyze the gas mix fed into the reaction chamber 18" and discharged from the reaction chamber 18". A control unit (not shown) can adjust the parameters of the plasmalysis apparatus 100", in particular based on the analysis of the compositions of the gas mix fed into the reaction chamber 18" and discharged from the reaction chamber 18". The parameters of the plasmalysis apparatus 100" can be set for the production of certain byproducts or a high hydrogen yield, for example. In addition, it is also possible to use gas separation methods for separating the gas mix that is discharged via the gas discharge line 24. Filters, for example in the gas supply lines and in the gas discharge line, can also be provided for filtering particles. Furthermore, it is also possible to use gas separation methods to provide an introduced gas mix with a high degree of purity. It is further possible to produce downstream products on the basis of the molecular hydrogen 10 and/or one or several of the by-products 14" in further synthesis steps or other processing or utilization steps.

The invention claimed is:

1. A plasmalysis apparatus for corona discharge-induced cracking of hydrogen-containing gas into molecular hydrogen and at least one byproduct or for producing molecular hydrogen and at least one by-product, comprising:
  a gas-tight reaction chamber;
  a gas supply line for the hydrogen-containing gas into the reaction chamber
  exactly one plasma electrode for generating corona discharges in the reaction chamber by means of a high-frequency alternating voltage; and
  a gas discharge line for the molecular hydrogen from the reaction chamber;
  wherein the gas-tight reaction chamber is enclosed by a wall that is designed to electrically insulate the plasma electrode from an outside of the wall, and wherein the plasma electrode; is connected to a high-frequency generator for generating the high-frequency alternating voltage.

2. The plasmalysis apparatus according to claim 1, wherein the gas supply line is arranged in such a way that the hydrogen-containing gas flows along a surface of the plasma electrode in the direction of the corona discharge.

3. The plasmalysis apparatus according to claim 1, wherein the plasma electrode has a flat end for generating the corona discharges in the reaction chamber.

4. The plasmalysis apparatus according to claim 1, wherein the plasma electrode has an opening that is connected to the gas supply line, and wherein the plasma electrode is arranged in such a way that the hydrogen-containing gas is fed into the reaction chamber through the opening of the plasma electrode.

5. The plasmalysis apparatus according to claim 4, wherein the apparatus is capable of emitting surge gas pulses from the opening of the plasma electrode to remove solid by-product forming in the reaction chamber from the reaction chamber.

6. The plasmalysis apparatus according to claim 4, wherein the opening of the plasma electrode is designed as a nozzle for feeding the hydrogen-containing gas into the reaction chamber.

7. The plasmalysis apparatus according to claim 1, wherein the plasmalysis apparatus features an insulator that electrically insulates the plasma electrode from an outside of the wall.

8. The plasmalysis apparatus according to claim 1, wherein the reaction chamber has a tapered section and an enlarged section between the gas supply line and the gas discharge line.

9. The plasmalysis apparatus according to claim 1, further comprising at least two plasmalysis apparatuses, wherein the plasmalysis apparatuses are connected in parallel or in series.

10. The plasmalysis apparatus according to claim 9, comprising:
  a storage unit containing a substance that can be used to generate hydrogen-containing gas; and/or
  a storage unit with hydrogen-containing gas; and/or
  an energy system for providing energy for the corona discharge-induced cracking of hydrogen-containing gas into molecular hydrogen and the at least one by-product; and/or
  a hydrogen storage unit for storing the molecular hydrogen;
  a drive that can be powered with molecular hydrogen; and/or
  an energy system that can be operated with molecular hydrogen.

11. The plasmalysis apparatus according to claim 1, wherein the hydrogen-containing gas is supplied through operation of a stationary structure or a mobile structure.

12. The plasmalysis apparatus according to claim 1, wherein a cross-section of the reaction chamber is enlarged in a direction from the gas supply line to the gas discharge line.

13. A method for the corona discharge-induced cracking of hydrogen-containing gas into molecular hydrogen and at least one by-product, or
  for producing molecular hydrogen and at least one by-product, or
  for producing downstream products from the molecular hydrogen and/or the at least one byproduct,
  comprising:
    feeding a hydrogen-containing gas into a gas-tight reaction chamber; and generating a corona discharge in the reaction chamber by means of exactly one plasma electrode operated with a high-frequency alternating voltage, wherein the gastight reaction chamber is enclosed by a wall that is designed to electrically insulate the plasma electrode from an outside of the wall, wherein molecular hydrogen and the at least one by-product are generated by the corona discharge.

14. The method pursuant to claim 13, further comprising the step of using the molecular hydrogen for at least one of the following applications:
- as fuel
- for the production of a hydrogen combustion product
- as a propellant
- for operating a hydrogen-powered vehicle
- for mixing with liquefied petroleum gas
- for mixing with liquefied natural gas
- for mixing with liquefied biomethane
- for mixing with natural gas
- for mixing with methane
- for producing synthesis gas
- for producing synthetic fuel
- for producing ammonia
- for refining crude oil
- for hydrogenation of chemical compounds
- for operating a hydrogen turbine
- for operating a fuel cell
- for operating combined heat and power
- for operating a combined heat and power plant
- for generating energy by means of a fuel cell
- for generating energy and/or heat by means of combined heat and power
- in a gas separation system
- in a gas compression system
- for producing synthetic raw materials
- for storing energy
- for generating heat
- for generating energy.

15. The method pursuant to claim 13, further comprising the step of using the at least one by-product for at least one of the following applications:
- as a reducing agent in the production of steel
- as fuel
- as an adsorbent
- as substrate of catalysts for heterogeneous catalysis
- as base material in the production of carbon structures
- as additive in the production of asphalt
- as additive in the production of cement
- as additive in the production of concrete
- as an ingredient in a thermally conductive agent
- as activated carbon for wastewater treatment
- as a feed additive
- as a binder additive
- as an additive to the soil for improved storage of nutrients
- as carbon for extracting phosphorous and other basic chemical substances in sewage sludge
- as an additive in building materials
- as an additive in plastics
- for insulation
- for filtration
- for packaging
- for lightweight construction.

* * * * *